US012347453B1

(12) United States Patent
Guo et al.

(10) Patent No.: US 12,347,453 B1
(45) Date of Patent: Jul. 1, 2025

(54) WEDGE REPEATABLE RUNOUT CORRECTION FOR INTERLEAVED SERVO PATTERNS IN A DATA STORAGE DEVICE

(71) Applicant: Western Digital Technologies, Inc., San Jose, CA (US)

(72) Inventors: Guoxiao Guo, Irvine, CA (US); Scott A. Ottele, Longmont, CO (US); Richard Conway, San Jose, CA (US); Joey M. Poss, Rochester, MN (US); Gary Herbst, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/652,260

(22) Filed: May 1, 2024

(51) Int. Cl.
  *G11B 5/596* (2006.01)
  *G11B 5/55* (2006.01)
  *G11B 17/02* (2006.01)

(52) U.S. Cl.
  CPC .................................... *G11B 17/02* (2013.01)

(58) Field of Classification Search
  CPC ... G11B 21/02; G11B 5/59627; G11B 5/5543; G11B 5/59633; G11B 5/59688; G11B 5/5965; G11B 5/54; G11B 5/52; G11B 5/58
  USPC .......................................................... 360/75
  See application file for complete search history.

(56) References Cited

U.S. PATENT DOCUMENTS

| | | |
|---|---|---|
| 4,249,538 A | 2/1981 | Musha |
| 4,642,709 A | 2/1987 | Vinal |
| 5,023,733 A | 6/1991 | Koga |
| 5,329,554 A | 7/1994 | Behrens |
| 5,335,123 A | 8/1994 | Shimizu |
| 5,430,584 A | 7/1995 | Petersen |
| 5,530,600 A | 6/1996 | Shrinkle |
| 5,570,241 A | 10/1996 | Nielsen |
| 5,640,286 A | 6/1997 | Acosta |
| 5,659,437 A | 8/1997 | Tsunekawa |
| 5,822,143 A | 10/1998 | Cloke |
| 6,111,717 A | 8/2000 | Cloke |
| 6,211,638 B1 | 4/2001 | Heaton |
| 6,366,423 B1 | 4/2002 | Ahn |
| 6,400,520 B1 | 6/2002 | Stoutenburgh |
| 6,483,659 B1 | 11/2002 | Kobayashi |
| 6,587,293 B1 | 7/2003 | Ding |
| 6,606,216 B1 | 8/2003 | Liikanen |
| 6,693,760 B1 | 2/2004 | Krounbi |
| 7,151,645 B2 | 12/2006 | Won |
| 7,333,280 B1 | 2/2008 | Lifchits |

(Continued)

OTHER PUBLICATIONS

Kun, M. (2017). "Servo Pattern Enhancements for High Areal Density Hard Disk Drives." Doctoral dissertation, Nanyang Technological University, School of Electrical & Electronic Engineering.

*Primary Examiner* — Nabil Z Hindi

(74) *Attorney, Agent, or Firm* — Patent Law Works LLP

(57) ABSTRACT

Example control circuitry, data storage devices, and methods for determining wedge repeatable runout correction values for interleaved servo patterns in a data storage device are described. The data storage device may include multiple heads actuated over different surfaces of a data storage device and receive read signals from two different heads over two different surfaces in parallel. The servo wedges of the two surfaces may be offset to enable parallel learning of wedge repeatable runout correction values.

20 Claims, 22 Drawing Sheets

(56) References Cited

U.S. PATENT DOCUMENTS

| | | |
|---|---|---|
| 7,511,912 B2 | 3/2009 | Wilson |
| 7,667,911 B2 | 2/2010 | Lau |
| 8,107,188 B2 | 1/2012 | Lau |
| 8,477,442 B2 | 7/2013 | Albrecht |
| 8,537,486 B2 * | 9/2013 | Liang ................ G11B 5/59627 360/55 |
| 8,693,134 B1 | 4/2014 | Xi |
| 9,013,824 B1 | 4/2015 | Guo |
| 9,142,246 B1 | 9/2015 | Trantham |
| 9,286,925 B1 | 3/2016 | Shepherd |
| 9,343,094 B1 | 5/2016 | Ma |
| 9,865,290 B1 | 1/2018 | Liang |
| 9,940,967 B1 | 4/2018 | French, Jr. |
| 9,972,349 B1 | 5/2018 | French, Jr. |
| 10,164,592 B1 | 12/2018 | Matousek |
| 10,199,054 B1 | 2/2019 | Nichols |
| 10,783,911 B1 | 9/2020 | Tsai |
| 10,867,629 B1 | 12/2020 | Kiyonaga |
| 10,950,265 B1 | 3/2021 | Noda |
| 10,964,345 B1 | 3/2021 | Haapala |
| 11,049,517 B1 | 6/2021 | Ryan |
| 11,430,481 B2 | 8/2022 | Katchmart |
| 11,532,326 B1 | 12/2022 | Laks |
| 11,557,320 B1 | 1/2023 | Katchmart |
| 11,568,894 B1 | 1/2023 | Szita |
| 11,574,650 B1 | 2/2023 | Liang |
| 11,735,210 B2 | 8/2023 | Poss |
| 11,735,215 B2 * | 8/2023 | Kuwahara .............. G11B 5/588 360/75 |
| 11,776,570 B2 | 10/2023 | Szita |
| 11,935,571 B1 | 3/2024 | Katchmart |
| 11,942,122 B1 | 3/2024 | Calfee |
| 2001/0000981 A1 | 5/2001 | Nguyen |
| 2001/0040754 A1 | 11/2001 | Heaton |
| 2002/0012193 A1 | 1/2002 | Kobayashi |
| 2002/0036860 A1 | 3/2002 | Bi |
| 2002/0057068 A1 | 5/2002 | Ho |
| 2002/0101681 A1 | 8/2002 | He |
| 2003/0112539 A1 | 6/2003 | Shu |
| 2006/0114598 A1 | 6/2006 | Lee |
| 2008/0253018 A1 | 10/2008 | Ryu |
| 2011/0249354 A1 | 10/2011 | Kosugi |
| 2013/0038959 A1 | 2/2013 | Liang |
| 2013/0314817 A1 | 11/2013 | Otsuki |
| 2016/0253108 A1 | 9/2016 | Jurey |
| 2016/0358621 A1 | 12/2016 | French, Jr. |
| 2019/0279675 A1 | 9/2019 | Schmidt |
| 2020/0286513 A1 | 9/2020 | Schmidt |
| 2022/0076703 A1 | 3/2022 | Katchmart |
| 2022/0310117 A1 | 9/2022 | Itou |

* cited by examiner

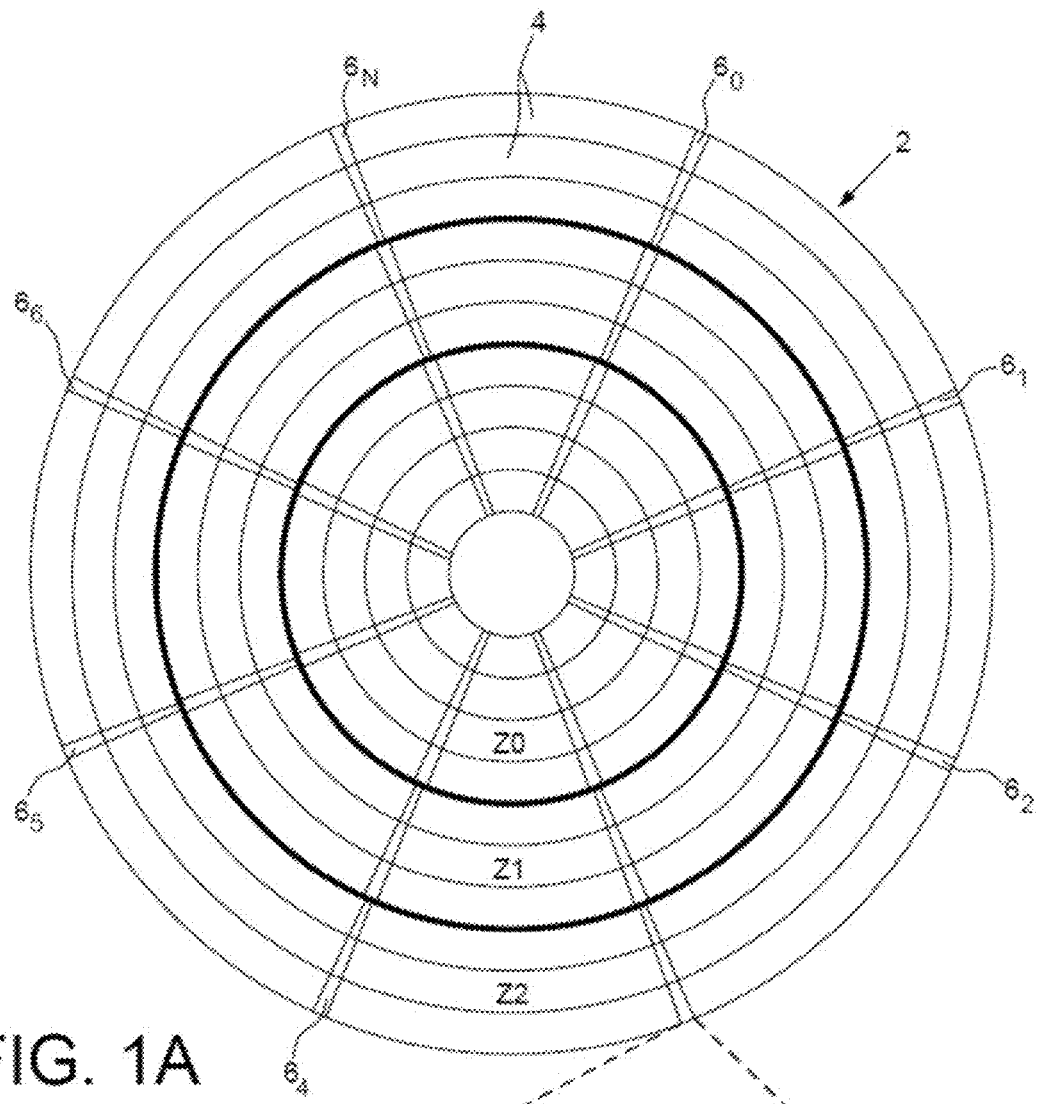
FIG. 1A
(Prior Art)
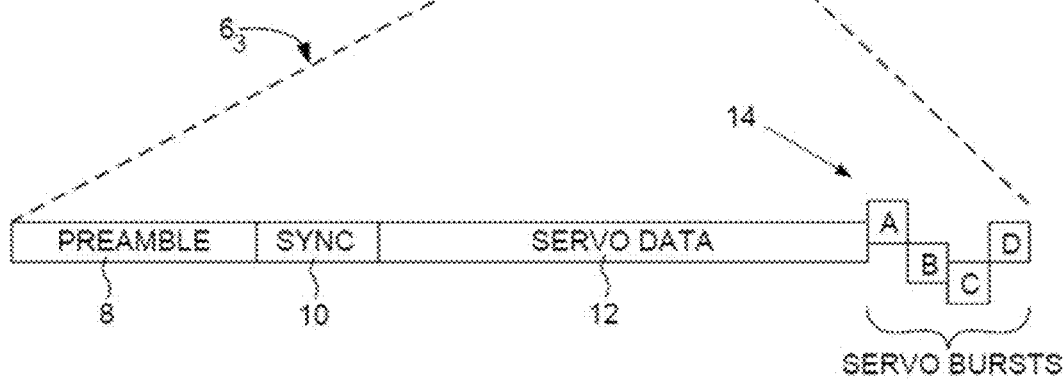

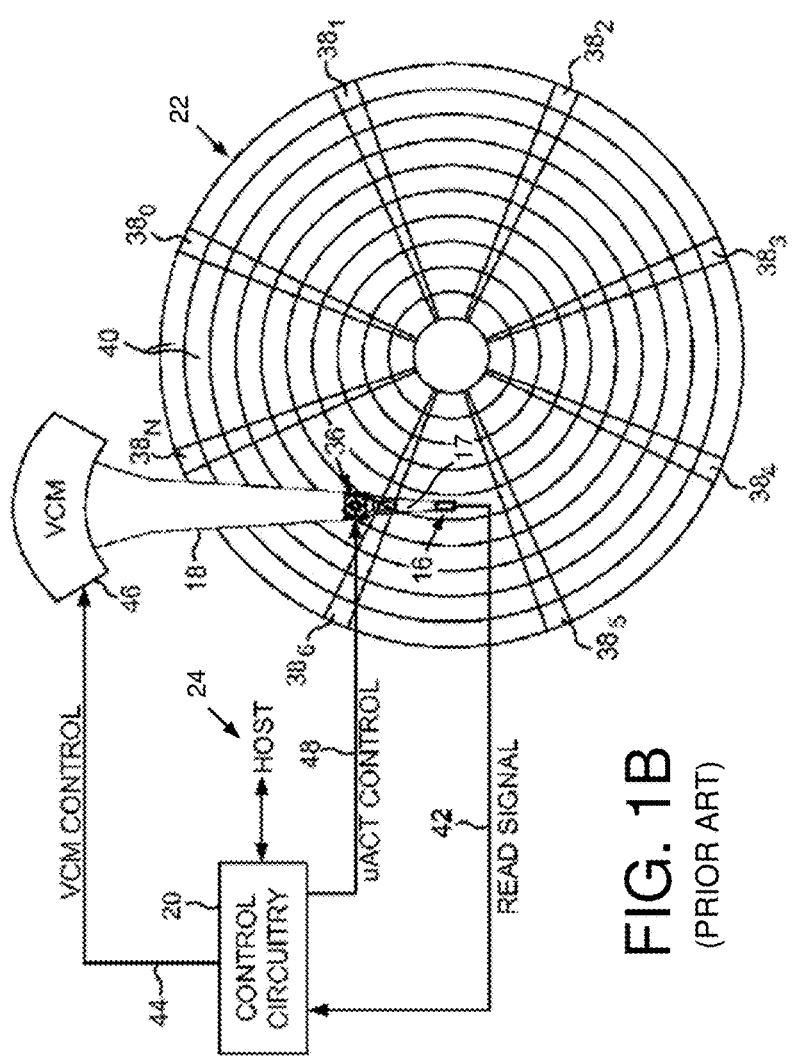
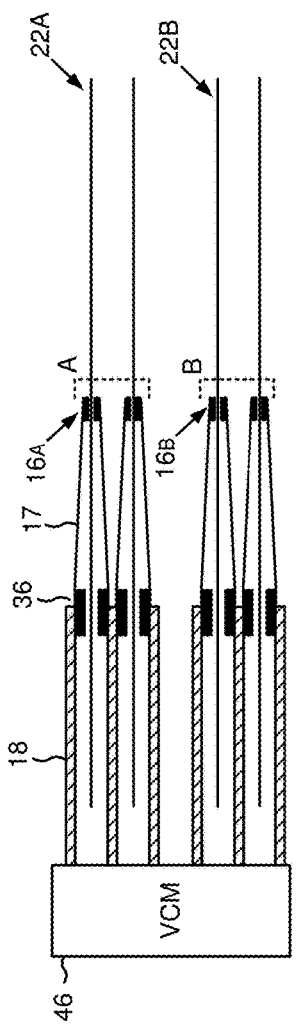
FIG. 1B (PRIOR ART)
FIG. 1C (PRIOR ART)

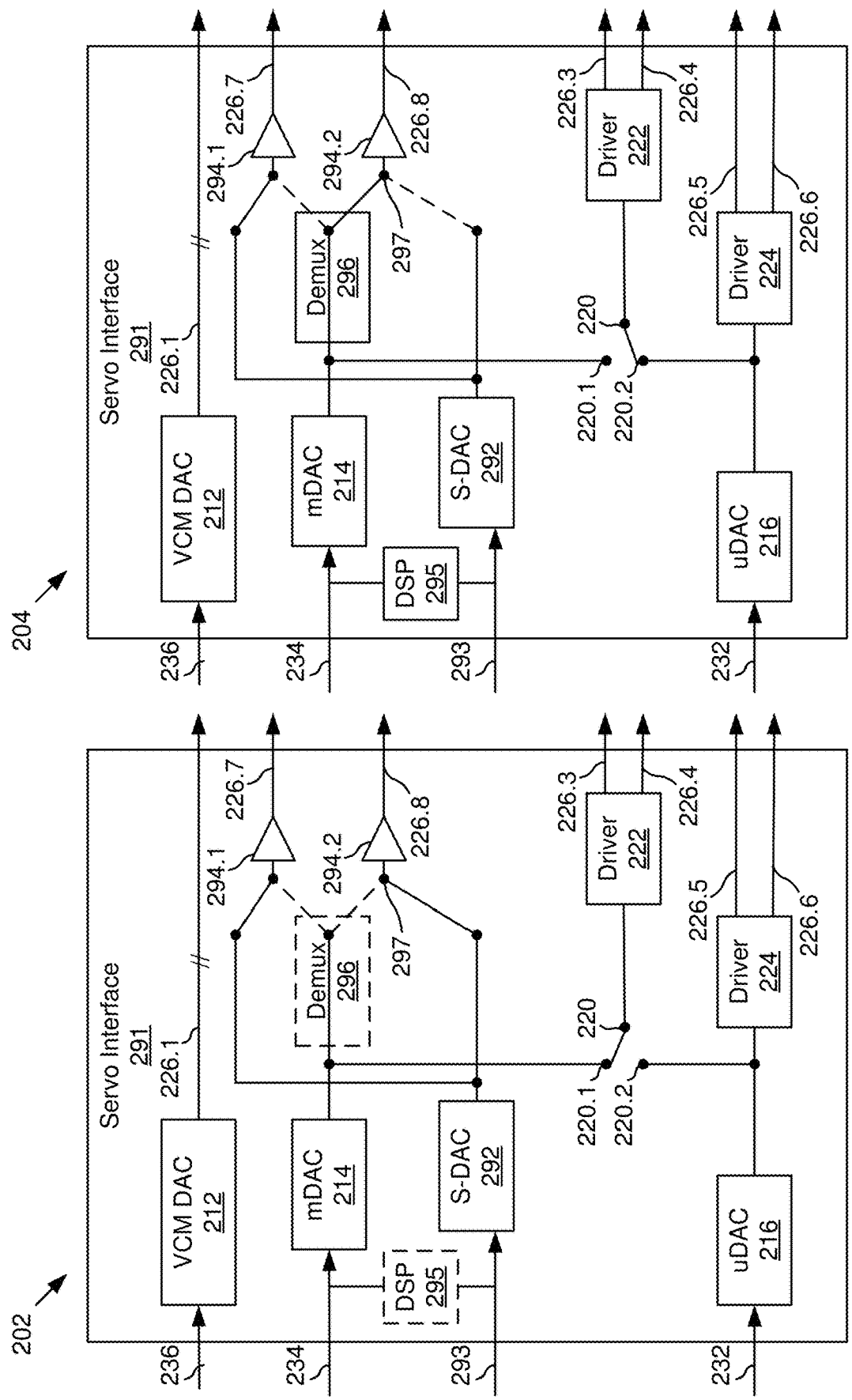

WEDGE REPEATABLE RUNOUT CORRECTION FOR INTERLEAVED SERVO PATTERNS IN A DATA STORAGE DEVICE

TECHNICAL FIELD

The present disclosure relates to the self-servo writing process for data storage devices. In particular, the present disclosure relates to using data storage device hardware circuitry, which may include read/write paths for two-dimensional magnetic recording, to generate improved repeatable runout correction.

BACKGROUND

The self-servo write (SSW) process is a pivotal step in the manufacturing of hard disk drives (HDDs), which are used extensively for data storage in various computing devices. This process involves the creation of servo tracks on the magnetic disk surfaces within the HDD. Servo tracks are used by the drive's control system to accurately position the read/write heads over data tracks during operation. The precision of servo track writing is integral to the drive's performance, as it directly impacts the areal density and reliability of the data storage.

Traditionally, servo track writing could be categorized into two primary methods: external and internal. External servo writing requires the positioning information to be written onto the disk before it is assembled into the HDD, often using specialized equipment. In contrast, internal writing, or SSW, utilizes the HDD's own read/write heads to write the servo information after the disk assembly is installed in the drive. SSW offers the advantage of aligning the servo tracks with the final assembled state of the drive, accounting for any variations that may occur during assembly.

The SSW process begins with the disk surfaces being initially blank. As the disks rotate, a servo writer embedded within the HDD writes a series of spiral reference patterns onto the disk, such as by sweeping the write heads between inner and outer diameters at a known rate and writing a known pattern of magnetic transitions. These spiral reference patterns provide positioning information that may be used to write the production servo pattern to the disk surfaces.

An example servo pattern is illustrated in FIG. 1A. The prior art disk format of FIG. 1A comprises a number of servo sectors $6_0$-$6_N$ recorded around the circumference of the disk 2 that define a plurality of servo tracks, wherein the data tracks 4 are defined relative to the servo tracks. Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations. In some configurations, servo and data tracks may be banded together to form different physical zones written at different track densities or frequencies, such as from the inner diameter of the disk (Z0) to the outer diameter of the disk (Z2).

Self-servo writing may be a lengthy process, particularly for data storage devices that include a large number of storage media disks. For example, some HDD form factors may include as many as 10 platters, each comprising two storage media surfaces. Therefore, writing servo tracks on multiple surfaces in parallel using multiple read/write heads may be advantageous. However, HDD control circuitry may not be designed to support simultaneous reading and writing of different heads on different surfaces. While specialized control circuitry could be provided external to the HDD control circuitry (with appropriate interfaces and data channels to and from the internal heads and actuators) or added to the internal HDD circuitry, the impact on the HDD cost for hardware that would only be used during the self-servo write process may be undesirable.

There is a need for technology that improves repeatable runout correction when using onboard hardware as self-servo writing control circuitry for parallel self-servo writing.

SUMMARY

Various aspects for data storage devices supporting parallel self-servo writing are described, particularly repeatable runout correction for using control circuitry that supports both self-servo writing and production read/write operations in data storage devices configured for two-dimensional magnetic recording (TDMR) with multiple read/write elements on each head and corresponding read/write paths.

One general aspect includes a data storage device that includes a first storage medium surface including a first servo pattern, a second storage medium surface including a second servo pattern, and control circuitry configured to: apply a first set of wedge repeatable runout correction values to positioning a first head over the first storage medium surface using the first servo pattern; and apply a second set of wedge repeatable runout correction values to positioning a second head over the second storage medium surface using the second servo pattern, where the first set of wedge repeatable runout correction values and the second set of wedge repeatable runout correction values were determined in parallel during a wedge repeatable runout learning operation for corresponding portions of the first servo pattern and the second servo pattern.

Implementations may include one or more of the following features. The first servo pattern may include a first plurality of servo wedges; the second servo pattern may include a second plurality of servo wedges; and the first plurality of servo wedges may be offset from the second plurality of servo wedges in the corresponding portions of the first servo pattern and the second servo pattern. The control circuitry may be further configured to, during wedge repeatable runout learning operations: read, using the first head, servo pattern segments for sequential servo wedges of the first servo pattern; read, using the second head and alternating with reading the servo pattern segments for the sequential servo wedges of the first servo pattern, servo pattern segments for sequential servo wedges of the second servo pattern; calculate the first set of wedge repeatable runout correction values for the sequential servo wedges of the first servo pattern; calculate the second set of wedge repeatable runout correction values for the sequential servo wedges of the second servo pattern; store the first set of wedge repeatable runout correction values in a non-volatile memory of the data storage device; and store the second set of wedge repeatable runout correction values in the non-volatile memory of the data storage device. The control circuitry may be further configured to execute the wedge repeatable runout learning operations prior to determining data tracks based on the first servo pattern and the second servo pattern. The control circuitry may be further configured to, during the wedge repeatable runout learning operations: determine a plurality of offset positions per servo track; execute a series of revolutions of the first storage medium surface and the second storage medium surface equal to a number of the plurality of offset positions per servo track; read, during each revolution and corresponding to each offset position of the plurality of offset positions, the sequential servo wedges of the first servo pattern and the second servo pattern; calculate, for each offset position of the plurality of offset positions, wedge repeatable runout correction values for the first set of wedge repeatable runout values; and calculate, for each offset position of the plurality of offset positions, wedge repeatable runout correction values for the second set of wedge repeatable runout values. The control circuitry may be further configured to interpolate additional wedge repeatable runout values between the calculated wedge repeatable runout correction values for the plurality of offset positions for the first set of wedge repeatable runout values and the second set of wedge repeatable runout values. The control circuitry may be further configured to, during the wedge repeatable runout learning operations, set an initial value for calculating a wedge repeatable runout correction value based on a wedge repeatable runout correction value for that servo wedge from a prior revolution of the series of revolutions. The control circuitry may be further configured to, during the wedge repeatable runout learning operations, position the first head and the second head to follow a spiral trajectory when executing the series of revolutions. The control circuitry may be further configured to, during the wedge repeatable runout learning operations: write at least one media test pattern to portions of the first storage medium surface between the sequential servo wedges in the first servo pattern; and write the at least one media test pattern to portions of the second storage medium surface between the sequential servo wedges in the second servo pattern. The control circuitry may be further configured to, during the wedge repeatable runout learning operations: execute a series of revolutions of the first storage medium surface and the second storage medium surface per servo track equal to a number of offset positions per servo track, where a servo track width divided by the number of offset positions is less than a writer width of the first head and a writer width of the second head; write a first media test pattern to the first storage medium surface and the second storage medium surface during a first series of revolutions per servo track, where the written first media test pattern for each revolution in the series of revolutions for the first media test pattern are phase aligned; and write a second media test pattern to the first storage medium surface and the second storage medium surface during a second series of revolutions per servo track, where the written second media test pattern for each revolution in the series of revolutions for the first media test pattern are phase aligned.

Another general aspect includes a method that includes: positioning, in a data storage device, a first head over a first storage medium surface using a first servo pattern and applying a first set of wedge repeatable runout correction values; and executing, at a first target position based on the first servo pattern, a first storage operation using the first head and the first storage medium surface; positioning, in the data storage device, a second head over a second storage medium surface using a second servo pattern and applying a second set of wedge repeatable runout correction values, where the first set of wedge repeatable runout correction values and the second set of wedge repeatable runout correction values were determined in parallel during a wedge repeatable runout learning operation for corresponding portions of the first servo pattern and the second servo pattern; and executing, at a second target position based on the second servo pattern, a second storage operation using the second head and the second storage medium surface.

Implementations may include one or more of the following features. The first servo pattern may include a first plurality of servo wedges; the second servo pattern may include a second plurality of servo wedges; and the first plurality of servo wedges may be offset from the second plurality of servo wedges in the corresponding portions of the first servo pattern and the second servo pattern. The method may include, during wedge repeatable runout learning operations: reading, using the first head, servo pattern segments for sequential servo wedges of the first servo pattern; reading, using the second head and alternating with reading the servo pattern segments for the sequential servo wedges of the first servo pattern, servo pattern segments for sequential servo wedges of the second servo pattern; calculating the first set of wedge repeatable runout correction values for the sequential servo wedges of the first servo pattern; calculating the second set of wedge repeatable runout correction values for the sequential servo wedges of the second servo pattern; storing the first set of wedge repeatable runout correction values in a non-volatile memory of the data storage device; and storing the second set of wedge repeatable runout correction values in the non-volatile memory of the data storage device. The method may include: executing the wedge repeatable runout learning operations prior to determining data tracks based on the first servo pattern and the second servo pattern. The method may include, during the wedge repeatable runout learning operations: determining a plurality of offset positions per servo track; executing a series of revolutions of the first storage medium surface and the second storage medium surface equal to a number of the plurality of offset positions per servo track; reading, during each revolution and corresponding to each offset position of the plurality of offset positions, the sequential servo wedges of the first servo pattern and the second servo pattern; calculating, for each offset position of the plurality of offset positions, wedge repeatable runout correction values for the first set of wedge repeatable runout values; and calculating, for each offset position of the plurality of offset positions, wedge repeatable runout correction values for the second set of wedge repeatable runout values. The method may include interpolating additional wedge repeatable runout values between the calculated wedge repeatable runout correction values for the plurality of offset positions for the first set of wedge repeatable runout values and the second set of wedge repeatable runout values. The method may include, during the wedge repeatable runout learning operations, setting an initial value for calculating a wedge repeatable runout correction value based on a wedge repeatable runout correction value for that servo wedge from a prior revolution of the series of revolutions. The method may include, during the wedge repeatable runout learning operations, positioning the first head and the second head to follow a spiral trajectory when executing the series of revolutions. The method may include, during the wedge repeatable runout learning operations: executing a series of revolutions of the first storage medium surface and the second storage medium surface per servo track equal to a number of offset positions per servo track, where a servo track width divided by the number of offset positions is less than a writer width of the first head and a writer width of the second head; writing, during a first series of revolutions per servo track and to portions of the first storage medium surface between the servo wedges of the first servo pattern, a first media test pattern, where the written first media test pattern for each revolution in the series of revolutions for the first media test pattern are phase aligned; writing, during the first series of revolutions per servo track and to portions of the second storage medium surface between the servo wedges of the second servo pattern, the first media test pattern; writing, during a second series of revolutions per servo track and to portions of the first storage medium surface between the servo wedges of the first servo pattern, a second media test pattern, where the written second media test pattern for each revolution in the series of revolutions for the second media test pattern are phase aligned; and writing, during the second series of revolutions per servo track and to portions of the second storage medium surface between the servo wedges of the second servo pattern, the second media test pattern.

Still another general aspect includes a data storage device that includes: a first head actuated over a first storage medium surface; a second head actuated over a second storage medium surface; means for reading, using the first head, servo pattern segments for sequential servo wedges of a first servo pattern on the first storage medium surface; means for reading, using the second head and alternating with reading the servo pattern segments for the sequential servo wedges of the first servo pattern, servo pattern segments for sequential servo wedges of a second servo pattern on the second storage medium surface; means for calculating a first set of wedge repeatable runout correction values for the sequential servo wedges of the first servo pattern; means for calculating a second set of wedge repeatable runout correction values for the sequential servo wedges of the second servo pattern; means for storing the first set of wedge repeatable runout correction values in a non-volatile memory of the data storage device; and means for storing the second set of wedge repeatable runout correction values in the non-volatile memory of the data storage device.

The present disclosure describes various aspects of innovative technology capable of improving self-servo writing to reduce data storage device production time/cost while also controlling cost impact on the control circuitry within the data storage device. The various embodiments include operations and control circuitry to overcome or at least reduce issues previously encountered in data storage devices and, accordingly, are more efficient, reliable, and/or cost-effective than other data storage devices. That is, the various embodiments disclosed herein include hardware and/or software with functionality to improve data storage device cost, quality, and manufacturing time, such as by using control circuitry that supports both two head parallel self-servo writing, hereafter self-servo writing or SSW for brevity, and one head production read/write operations in data storage devices by enabling improved and parallel calculation of repeatable runout correction values. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

FIG. 1A is a diagram of a prior art disk format comprising a plurality of servo sectors defining servo tracks.

FIGS. 1B and 1C are diagrams of a prior art data storage device in the form of a disk drive comprising at least one head actuated over a disk surface using control circuitry and a corresponding side view of an arm/actuator assembly for two banks of heads.

FIGS. 2C and 2D are diagrams of another example servo interface circuit for the control circuitry of FIGS. 2A and 2B in self-servo write and read/write operating modes.

DETAILED DESCRIPTION

Figure 2A:
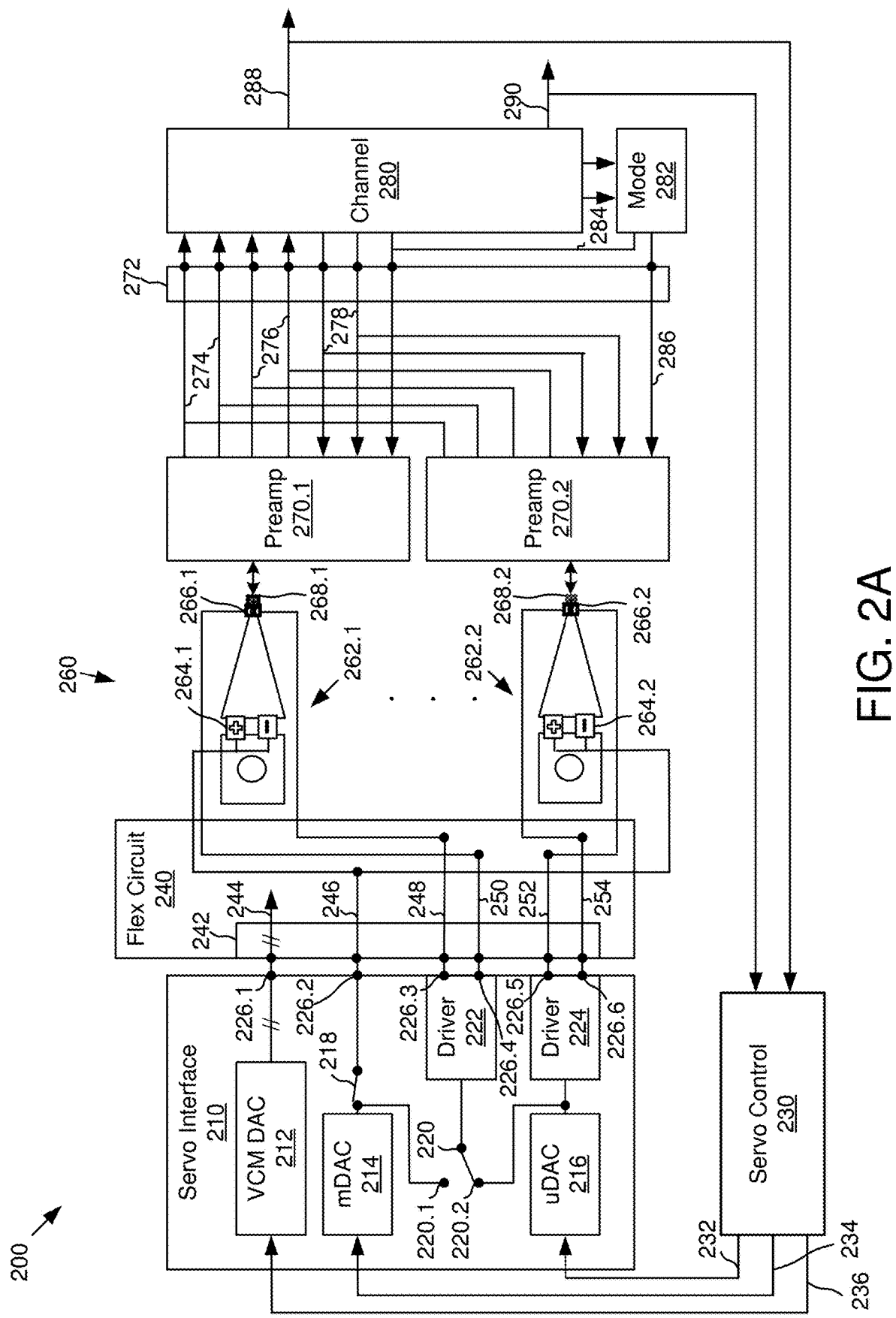
FIGS. 2A and 2B are diagrams of control circuitry operating in two different modes to support self-servo write and read/write operations.

Parallel self-servo write (SSW) based on concurrent SSW fill using onboard data storage device electronics and independent micro dual stage actuator position control may improve SSW test time without significantly impacting the cost of the electronics. In some configurations, the data storage device reads one head from an upper bank preamplifier circuit and one head from a lower bank preamplifier circuit in parallel based on spiral reference patterns previously written to the disk. The channel processes the spiral position and timing detection using the storage device controller and decoupled two-dimensional magnetic recording (TDMR) channels. Separate micro actuator drivers for the heads on the two banks provide separate positioning based on a shared voice coil motor (VCM) position. The SSW firmware may calculate the two heads position errors and phase errors in parallel. The VCM may track the average decoupled position error signal (PES), while each micro actuator compensates for its respective PES. In some configurations, phase control may also be handled separately for the two heads. In some configurations, multiple passes of positioning based on previously written spirals to write better spirals before ultimately writing the concentric servo tracks and corresponding servo sectors for the production servo pattern may be used.

In FIG. 1B control circuitry 20 of a data storage device, such as a hard disk drive (HDD), processes a read signal 42 emanating from the head 16 to demodulate the servo sectors $38_0$-$38_N$ and generate a position error signal (PES) representing an error between the actual position of the head and a target position relative to a target track in a track follow operation. Control circuitry 20 filters the PES using suitable compensation filters to generate a plurality of control signals for positioning head 16 relative to the surface of disk 22. A VCM control signal may be applied to a VCM 46 which rotates an actuator arm 18 about a pivot, thereby actuating head 16 radially over disk 22 in a direction that reduces the PES. A milli actuator control signal 48 may be applied to a piezoelectric actuator 36 on suspension 17 near the tip of arm 18 to provide fine lateral positioning to further reduce the PES. This actuator hereafter may be called milli actuator or suspension actuator. In some configurations, additional actuators may be provided on suspension 17, such as a micro actuator positioned even closer to head 16 and receiving still another control signal from control circuitry 20. This actuator hereafter may be called micro actuator or head actuator. Servo sectors $38_0$-$38_N$ may comprise any suitable position information, such as a servo track and wedge address for coarse positioning and servo bursts for fine positioning as described above with reference to FIG. 1A. The servo bursts may comprise any suitable pattern, such as an amplitude-based servo pattern as shown in FIG. 1A, or a suitable phase-based servo pattern. During data read/write operations, control circuitry 20 may use the feedback from servo sectors $38_0$-$38_N$ to position head 16 over disk 22 to seek to and follow desired data tracks for data read and write operations. For example, control circuitry 20 may receive host storage commands from host 24 through a host interface and determine corresponding data read and write operations to read previously written data from disk 22 or write new data to disk 22.

In FIG. 1C, a side view of the head and disk stacks of a data storage device comprised of multiple disks 22 and corresponding heads 16. For example, each disk 22 may include two recordable storage media surfaces on opposing surfaces of the disk and read by corresponding heads. In FIG. 1C, the disk stack includes four disks, eight storage medium surfaces, and eight corresponding heads. The heads and disks may be grouped in banks. For example, disks 22A and heads 16A may correspond to a first bank of heads and media and disks 22B and heads 16B may correspond to a second bank of heads and media. In some configurations, a single VCM 46 may provide gross positioning of both head banks over the corresponding media surfaces. In some configurations, a split actuator may include separate VCMs (and receive corresponding control signals) for the different head banks. Additionally, each arm may include one or more arm or head actuators 36, such as piezoelectric micro actuators, somewhere along the length of suspension 17. Each suspension or head actuator may be individually controlled when the corresponding head is the active head for reading or writing data. In some configurations, each bank of heads may include a corresponding preamplifier circuit and flex circuit connection to the data storage device controller circuit.

Figure 2B:
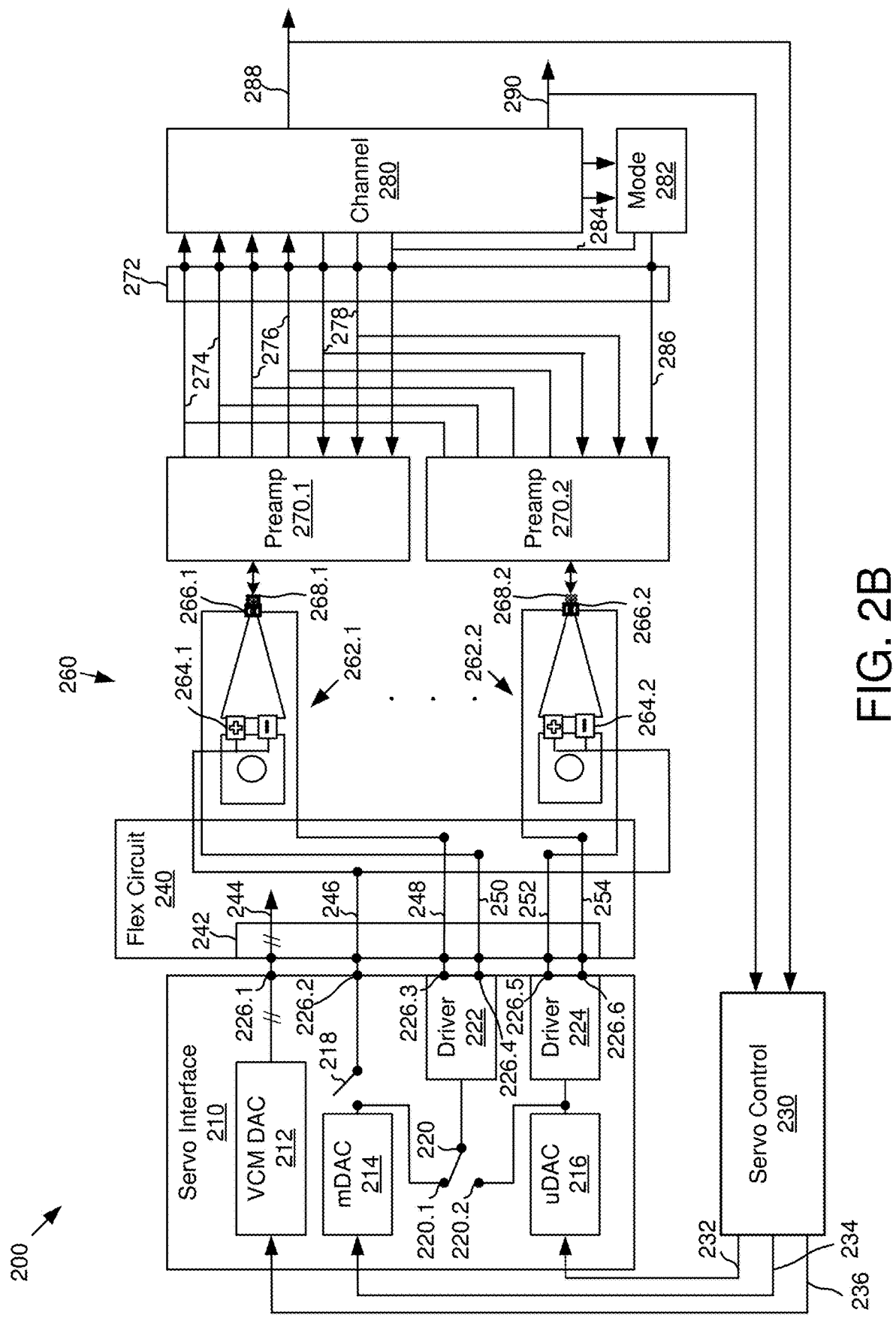

FIGS. 2A and 2B show an example configuration of control circuitry 200 for positioning heads organized in two head banks in a data storage device. In FIG. 2A, control circuitry 200 is configured for data read/write operations that are positioned based on the servo data written during the self-servo write operation, and, in FIG. 2B, control circuitry 200 is configured for self-servo write operation (during the self-servo write portion of the manufacturing and test process). In the configuration shown, control circuitry 200 includes servo interface circuit 210, servo control circuit 230 (sometimes referred to as a servo interface controller), flex circuit 240, preamplifier circuits 270, read/write channel 280, and a variety of connections (such as wires or traces) and interfaces (such as pins or connectors). Control circuitry 200 interacts with head banks 260 for both actuator control and read and write signals. Only a portion of one suspension assembly 262 is shown for each head bank, but each head bank may include multiple suspensions and heads corresponding to the number of storage media surfaces in the disk stack. For example, a four platter HDD may include eight suspension/heads organized in two banks of four heads or a ten platter HDD may include twenty suspension/heads organized in two banks of ten heads. Control circuitry 200 may be switchable to select any head (and corresponding actuators) from each stack for parallel SSW operation, so only the control paths for the selected heads are shown.

Servo interface circuit 210 may include a set of motor or actuator drivers for positioning the heads over the media surfaces. Servo interface circuit 210 may receive digital servo control signals calculated by servo control logic 230 to generate an analog control signal for the respective motors or actuators. Each circuit for generating the analog control signal for a motor or actuator may be referred to as a motor or actuator control circuit. For example, servo interface circuit 210 may include a VCM digital-to-analog converter (DAC) 212 configured to receive a digital position control signal for the VCM and convert it into a pair of analog control signals suitable to drive the VCM to the desired position. Milli actuator DAC 214 may be configured to provide an actuator control signal to the milli actuator (e.g., piezoelectric actuator on the suspension near arm tip) of the selected head during read/write mode or the micro actuator of the second head during self-servo write mode. Milli actuator DAC 214 may be configured to receive a digital position control signal for the milli actuator or, in the parallel self-servo write mode, the second micro actuator and convert the digital control signal to the analog control signal provided to that actuator through a dual-phase driver block 222. Micro actuator DAC 216 may be configured to provide an actuator control signal to the micro actuator (e.g., piezoelectric actuator closest to the head) of the selected head during read/write mode or self-servo write mode. Micro actuator DAC 216 may be configured to receive a digital position control signal for the selected micro actuator and convert the digital control signal to the analog control signal provided to that actuator. In some configurations, micro actuator DAC 216 may be coupled to a pair of dual-phase driver circuits 222 and 224. The dual-phase driver circuits 222 and 224 may amplify a same phase and an inverted phase of the analog control signal from micro actuator DAC 216 prior to sending them to the micro actuators of the selected heads. The dual-phase driver circuits 222 and 224 may generate alternating current (AC) control signals for the connected micro actuators. This configuration supports the read/write mode. In the parallel self-servo write mode, the micro actuator DAC 216 only drives block 224, whereas block 222 is controlled by DAC 214.

Servo interface circuit 210 may include one or more switches for changing operation and/or control paths of the DACs between the self-servo write mode and the data read/write mode. For example, switch 218 may determine whether milli actuator DAC 214 is electrically connected to the milli actuator for the target head in read/write mode or controls one of the micro actuators during self-servo write mode. Switch 220 may select whether dual-phase driver circuit 222 is connected to milli actuator DAC 214 or micro actuator DAC 216.

In FIG. 2A, switch 218 is closed, connecting milli actuator DAC 214 to the milli actuator of the target head for the read/write operation and selection of the preamp may determine which head is being controlled (from the first or second head bank). Switch 220 is on for path 220.2 to connect micro actuator DAC 216 to both dual-phase driver circuits 222 and 224. This allows micro actuator DAC 216 to drive the micro actuator of the target head for the read/write operation, also based on the preamps determining which head is being controlled. This mode corresponds to the regular read/write.

In FIG. 2B, switch 218 is open, disconnecting milli actuator DAC 214 from the milli actuators. Switch 220 is on for path 220.1 to connect milli actuator DAC 214 to dual-phase driver circuit 222 and thereby control the micro actuator of one of the target heads while micro actuator DAC 216 maintains its connection to dual-phase driver circuit 224 to control the micro actuator of the other target head for parallel self-servo write.

In some configurations, servo interface circuit 210 may include a plurality of interface connections 226.1-226.6 to connect the control paths from the DACs to the respective motors or actuators through flex circuit 240. For example, flex circuit 240 may include a plurality of wires or traces that connect to pin interfaces from servo interface circuit 210 and provide an electrical connection to the input interface connections on the respective motor or actuator assemblies. Flex circuit 240 may comprise an interface connector 242 that connects to board-based circuitry in the data storage device, such as a printed circuit board assembly (PCBA) comprising the device controller, servo interface circuit 210, servo control logic 230, and channel 280. For diagram purposes, interfaces connections 272 between channel 280 and preamplifier circuits 270 are shown separately, but they may be part of the same pin interfaces 242 and traces through flex circuit 240. Flex circuit 240 may receive a pair of VCM control signals 244 and electrically connect it in a VCM control path to the VCM moving the head stack. Flex circuit 240 may receive a milli actuator control signal 246 and electrically connect it in a milli actuator control path to the milli actuator of the target head. In some configurations (described later), an additional DAC may be present in servo interface circuit 210 to drive the milli actuators during self-servo write mode using milli actuator control signal 246. Flex circuit 240 may receive micro actuator control signals 248, 250, 252, and 254 to electrically connect micro actuator DAC 216 and/or milli actuator DAC 214 in micro actuator control paths to the micro actuators of the target head(s).

Servo control logic 230 may generate the motor and actuator control signals for adjusting the positioning of the heads over the media surfaces. Servo control logic 230 may use a combination of hardware and software to receive position error signals 288 and 290 from channel 280 and generate digital VCM and actuator control signals in the form of digital adjustment values for changing the position of the respective motors or actuators. For example, servo control logic 230 may generate digital VCM control signal 236, milli actuator control signal 234, and micro actuator control signal 232. In some configurations, servo control logic 230 may also provide a control signal (not shown) for selecting the switch configuration for switches 218 and 220 and switching between date read/write mode and self-servo write mode.

Head banks 260 may include electronics, motors, and actuators for positioning the heads over the storage medium and generating read and write signals to interact with the storage medium. Each of suspension assemblies 262 may support a corresponding head 268 over a storage medium surface and be grossly positioned by the VCM rotating the head stack relative to the disk stack. Each suspension assembly 262 may include a number of dual or multi-stage actuators for increasingly fine positioning. For example, each suspension assembly 262 may include a milli actuator 264 capable of laterally adjusting the position of a portion of the suspension across an actuator range and a micro actuator 266 capable of laterally adjusting the position of head 268 proximate the distal end of the suspension. In some configurations, the milli actuator may be referred to as a suspension actuator (that positions a portion of the suspension), and the micro actuator may be referred to as a head actuator (that actuates the position of the head at the end of the suspension). As described above, servo interface circuit 210 may provide control signals to two or more actuators to control a target head or heads. For example, during data read/write operation, head 268.1 on suspension assembly 262.1 may be selected as the target head and actuator control signals may be sent to milli actuator 264.1 and micro actuator 266.1 or head 268.2 on suspension assembly 262.2 may be selected as the target head and actuator control signals may be sent to milli actuator 264.2 and micro actuator 266.2. During self-servo write mode, both heads 268.1 and 268.2 may be selected for parallel self-servo writing and actuator control signals may be sent in parallel to micro actuator 266.1 and 266.2.

Preamplifier circuits 270 may control and amplify read and write signals between channel 280 and heads 268. In some configurations, each head bank has a corresponding preamplifier circuit 270, such as preamplifier circuit 270.1 for the upper bank and preamplifier circuit 270.2 for the lower bank. Each preamplifier circuit 270 may be configured to provide write signals and read signals for a selected head in their head bank and connect the read and write paths to corresponding interfaces for the channel. In the configuration shown, heads 268 are TDMR heads comprising two read elements and one write element. Preamplifier circuits 270 and channel 280 are configured with corresponding read and write channels. For example, preamplifier circuit 270.1 includes two read channels 274 and 276 and one write channel 278 for connecting to corresponding interfaces 272 to channel 280 through flex circuit 240. Preamplifier circuit 270.2 also includes selective electrical connections to read channels 274 and 276 and write channel 278. Preamplifier circuits 270 may be configured to receive control signals from channel 280 and/or an associated controller to select which heads and corresponding connections to the read and write channels are active. During data read/write mode, only one preamplifier circuit 270 and selected head 268 may be active to provide the two read signals from the read elements on that head. During parallel self-servo write mode, each preamplifier may select a head and provide only one read signal (selecting between the two read elements on each head) such that the two read channels 274 and 276 receive a single read signal from each head and channel 280 may decouple the read signals to calculate separate PES values for the two heads in parallel.

In some configurations, additional controller logic may be used to select between data read/write mode and self-servo write mode for preamplifiers 270. For example, mode selection logic 282 may be in communication with channel 280 or an associated controller to receive head selection control signals 284 and send corresponding preamplifier control signals 286 to preamplifier circuits 270. A read/write control signal may be configured to selectively send preamplifier control signal 286 only to one preamplifier circuit at a time. A second control signal and corresponding switching may be provided by mode selection logic 282 to send head and element selection control information via preamplifier control signal 286 to both preamplifier circuits 270 in parallel.

In FIGS. 2C and 2D, another example configuration of a servo interface circuit 291 for use in control circuitry 200 is shown. FIG. 2C shows a configuration 202 for self-servo write operation mode and FIG. 2D shows a configuration 204 for data read/write operating mode. VCM DAC 212 and micro actuator DAC 216 may operate substantially as described above with regard to FIGS. 2A and 2B.

As shown in configuration 202, milli actuator DAC 214 may also operate substantially as described in FIG. 2B during self-servo writing and be connected at 220.1 to dual-phase driver 222 to generate the actuator control signals 226.3 and 226.4 for the micro actuator on the suspension of the second head. A third actuator DAC 292 (referred to as S-DAC 292) is configured to generate control signal for the milli actuators during parallel self-servo writing. S-DAC 292 may receive a third digital actuator control signal 293 from a servo controller, such as servo controller 230 in FIG. 2B and provide a control signal to control the milli actuators via 226.7 and via 226.8. Note that these actuator control signals may be in addition to one or more control signals to the voice control motor for positioning the head stack. Servo interface circuit 291 may include a digital signal processor (DSP) 295 and a demultiplexor 296. These components may be disabled or bypassed during parallel self-servo writing. For example, demultiplexor 296 may include or connect to a switch 297 configured to disconnect demultiplexor 296 from outer channel 294.1 and inner channel 294.2 during self-servo write operations. Similarly, DSP 295 may be disabled at the same time. Without the operation of demultiplexor 296, S-DAC 292 may control the milli actuators for both head banks and the suspensions supporting the heads of the target write pair. In some configurations, the milli actuators driving the head pairs for parallel servo-write are connected to move in opposite directions. Hence the milli actuator control signal 226 will drive the heads to move in opposite directions, allowing for coupled position control with range limited by the milli actuator stroke. Configuration 202 may include additional pins for connecting to electrically adjacent components. In some configuration, switches 220 and 297 may only be switched between modes when both the micro actuators and milli actuators are disabled, such as when the heads are parked between operations.

As shown in configuration 204, during data read/write operations, DSP 295 and demultiplexor 296 may be activated. For example, switch 297 may connect demultiplexor 296 to inner channel 294.2 and disconnect S-DAC 292 from inner channel 294.2. DSP 295 may modify the digital control signal 234 to drive S-DAC 292 to provide a second leg of the actuator control signal to facilitate the milli actuator to outer channel 294.1 switch process. The control signals generated by milli actuator DAC 214 and S-DAC 292 may each contribute to the control of the milli actuator for the target head during read/write operations, by respectively generating milli actuator control signals 226.7 for the outer heads and 226.8 for the rest of the heads.

Figure 3A:
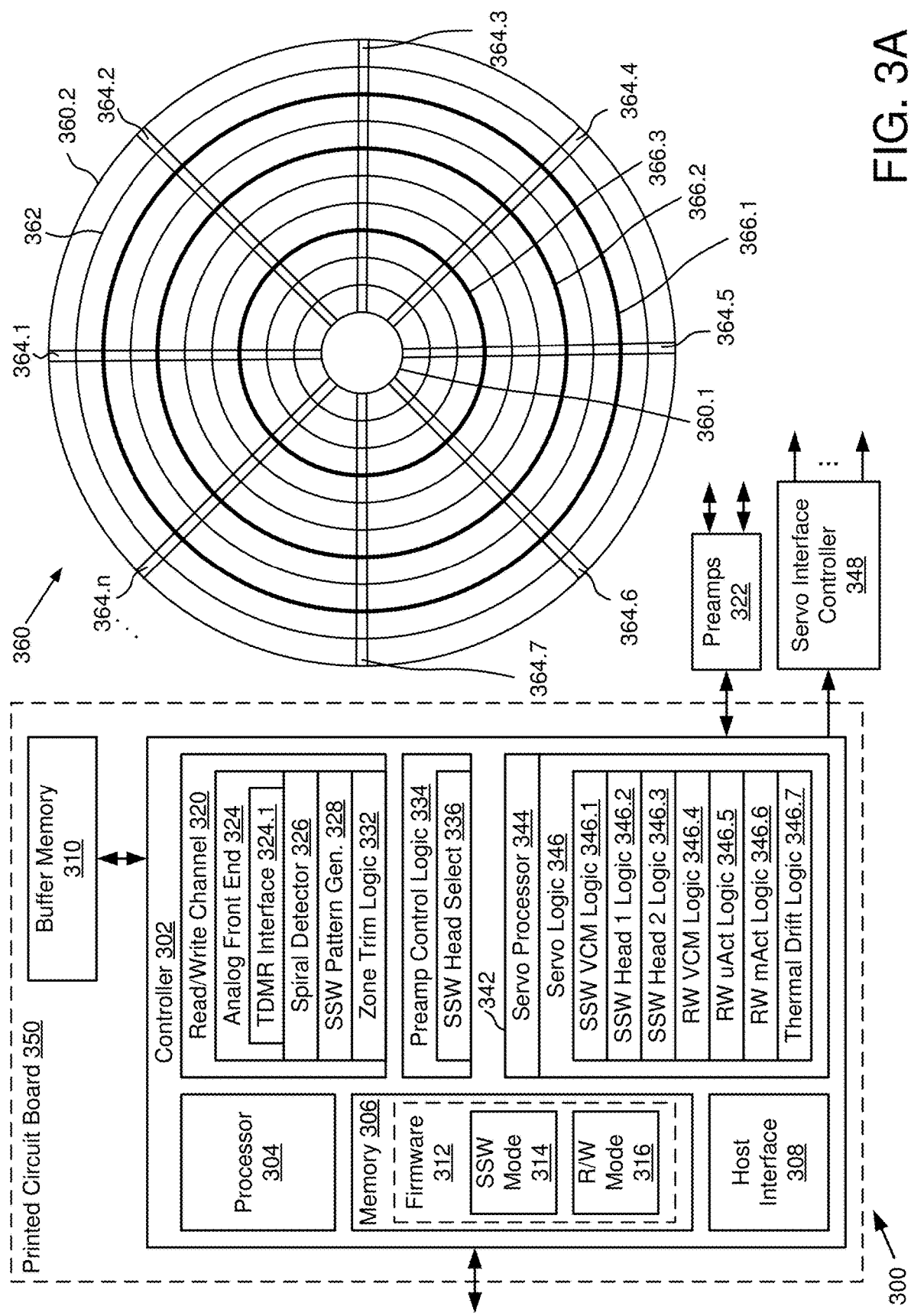
FIG. 3A is a block diagram of a configuration of data storage device including control circuitry and a storage medium format written using self-servo write.

FIG. 3A shows a portion of example control circuitry 300 and a storage medium 360 for a data storage device, such as an HDD. In the example shown, control circuitry 300 may include one or more hardware controllers. Controller 302 may comprise a storage device controller configured to receive host storage commands, process storage operations for writing, reading, and managing data stored to non-volatile storage media in the disk drive, such as the magnetic media disk of storage medium 360 or FIGS. 1A, 1B, and/or 1C. In some embodiments, controller 302 may correspond to a separate host interface and read/write path to a subset of disk surfaces in a data storage device with multiple controllers. In some embodiments, controller 302 may be configured to manage servo, read/write, and self-servo writing operations for one or more actuators, heads, and corresponding writer and reader elements.

Controller 302 may comprise a processor 304, a memory 306, a host interface 308, and access to a buffer memory 310. Controllers 302 may also comprise a read/write channel 320, and a servo controller 342 including a servo processor 344 and servo logic 346. In some embodiments, one or more of host interface 308, read/write channel 320, and servo controller 342 may be embodied in separate packages, such as application specific integrated circuits (ASICs), systems on a chip (SOCs), or other specialized circuits that interface with processor 304 and memory 306 for carrying out their respective functions. Controller 302 may include physical and electrical interfaces for connecting to buffer memory 310, a power source (not shown), preamp 322, servo interface controller 348, other controllers, and/or other circuitry components. In some embodiments, the components of controller 302 may be interconnected by a bus that includes one or more conductors that permit communication among the components. For example, processor 304, memory 306, host interface 308, read/write channel 320, and/or servo controller 342 may be components attached to a printed circuit board assembly (PCBA) 350 that provides one or more layers of interconnect conductors among the components.

Processor 304 may include any type of conventional processor or microprocessor that interprets and executes instructions. Processor 304 may include multiple hardware processors configured to operate independently or in combination (such as multiple processor cores executing threaded operations) to execute one or more instruction sets. Memory 306 may include a random access memory (RAM) or another type of dynamic storage device that stores information and instructions for execution by processor 304 and/or a read only memory (ROM) or another type of static storage device that stores static information and instructions for use by processor 304 and/or any suitable storage element, such as a system portion of a hard disk media or a solid state storage element. Memory 306 may be configured to store controller firmware 312, comprising instructions that include one or more modules or sub-modules for specific data storage device operations and processor 304 may execute those instructions, including controlling communication with other components, such as host interface 308, buffer memory 310, read/write channel 320, and servo controller 342.

Controller firmware 312 may include firmware for operating control circuitry 300 and the corresponding data storage device in different operating modes. For example, controller firmware 312 may support a self-servo write mode 314 for writing servo patterns to the storage medium using control circuitry 300. In some configurations, self-servo write mode 314 may be initiated in a data storage device after assembly and may enable writing a desired servo pattern similar to that shown for storage medium 360. Self-servo write mode 314 may start from one or more blank storage medium surfaces and/or a surface previously written with a spiral reference pattern. In some configurations, self-servo write mode 314 may include a series of iteratively written spiral reference patterns and the writing and rewriting of servo sectors, such as servo sectors 364, until a desired servo pattern and corresponding quality metrics are achieved. After a desired servo pattern and servo performance level is achieved, controller firmware 312 may end self-servo write mode 314 and initiate a data read/write mode 316 to write and read data in data tracks defined relative to the servo pattern. For example, data read/write mode 316 may be the production configuration of control circuitry 300 used for the remaining configuration and testing of the data storage device, as well as during its production life in field operation.

An example servo format as produced by self-servo write mode 314 for use during data read write mode 316 is shown with reference to storage medium surface 360. The data track format may be configured in relation to the servo format, but they may not include one-to-one mapping of data tracks to servo tracks. For example, the servo format may define concentric servo tracks 362 defined by servo sectors 364.1-364.n. Servo sectors 364 and corresponding servo tracks 362 may have varying data rates selected to more fully utilize the different track lengths and speeds from the inner diameter (ID) 360.1 to outer diameter (OD) 360.2 of the spinning disk. Data tracks may be configured to overlay the servo tracks with data track formatting as either concentric tracks, where each track forms a distinct ring with a starting and ending point on the same circumference, or continuous tracks, where the tracks form a continuous spiral with start and end positions that are not on the same circumference, and may support different track densities and track zones relative to the servo format. In some configurations, servo tracks 362 may be organized into zones of varying track density or frequency. A servo zone may refer to a set of concentrically adjacent servo tracks with a shared nominal track density and/or frequency that is similar to one another and different from the adjacent zones. Each adjacent pair of servo zones may also define a zone boundary 366 between them. Zone boundaries may require special operations to manage servo writing and/or servo positioning when the zone boundaries are crossed. For example, positioning information, timing, and channel settings may change when zone boundaries are crossed. Track configuration may be stored in a set of media configuration parameters for the servo and data track formats for use by other components of the system, such as read/write channel 320 and servo controller 342.

Host interface 308 may include any transceiver-like mechanism that enables the data storage device to communicate with other devices and/or systems, such as a host system for which the storage device provides data storage. Host interface 308 may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe), universal serial bus (USB), etc., for connecting host interface 308 to a peripheral interface or network port.

Buffer memory 310 may include a RAM, flash, or another type of dynamic storage device for storing host data and other information in transit between the storage media of the storage device and the host (via host interface 308). In some embodiments, buffer memory 310 is a separate memory device from memory 306 and the disk surfaces or other non-volatile memory of the data storage device.

Read/write channel 320 may include one or more specialized circuits configured for processing binary data to be written to the disk surfaces using an analog write signal and processing the analog read signal from the disk surfaces back into binary data. For example, read/write channel 320 may include a write path comprised of various data scramblers, run-length limited (RLL) encoders, iterative error correction code (ECC) encoders, precompensation circuits, and other data or signal processing components. Read/write channel 320 may include a read path comprised of various amplifiers, filters, equalizers, analog-to-digital converters (ADCs), soft information detectors, iterative ECC decoders, and other data or signal processing components. The write channel components may comprise a write channel circuit and the read channel components may comprise a read channel circuit, though the circuits may share some components. Read/write channel 320 may provide the analog write signal to and receive the analog read signal from preamps 322, which control and amplify signals to and from the heads. During data read/write operating mode 316, binary data for recording to the storage medium may be received by read/write channel 320 from controller firmware 312 and decoded data from read/write channel 320 may be passed to controller firmware 312 and/or directed to buffer memory 310 for communication to the host. Read/write channel 320 may also separate the servo read signal(s) from the data read signal to support servo controller 342.

In some configurations, read/write channel 320 may include an analog front end 324 configured to receive the analog read signal from preamp 322 and convert it into a digital read signal for processing by other components of read/write channel 320. For example, analog front end 324 may include an analog-digital converter (ADC), timing circuit, and one or more filters, equalizers, and/or other signal conditioning components for generating the digital read data. In some configurations, analog front end 324 and/or other components of read/write channel 320 may support operations of servo controller 342. For example, the read signal received through preamp 322 and analog front end 324 may provide the servo read signal based on the read head response generated when the head passes over servo sectors 364 during self-servo write, track seek, track follow, and other servo operations. In some configurations, read/write channel 320 and analog front end 324 may be configured for TDMR read/write operation and interface with TDMR heads through preamps 322. For example, each TDMR head may include a single writer element and two reader elements and, during TDMR read/write operation, read/write channel 320 may receive the two read signals from the head in parallel for reading servo and user data. Analog front end 324 may be configured with a TDMR interface 324.1 that includes two read channel inputs and one write channel output to receive and send data to a selected head. In self-servo write mode, the two read channels may be decoupled to generate separate read signals from two heads in parallel and provide separate servo read signals and corresponding position error signals in servo controller 342.

In some configurations, read/write channel 320, servo controller 342, and/or controller 302 may include self-servo writing functions for operation during self-servo writing mode 314. These functions may be configured in firmware running on controller 302 and/or its subcomponents. For example, reference spiral detector 326 may include logic for generating position information based on one or more spiral reference patterns previously written to the storage medium surface. The magnetic transitions and information contained in spiral reference patterns may not be similar to production servo patterns written in servo sectors 364 or user data patterns from data tracks and different position information and related position error signals may be used. Reference spiral detector 326 may be configured with logic to process the received read signals from target heads to generate position information and/or PES.

An SSW pattern generator 328 may generate write signals to target heads for writing the production servo sectors and/or improved spiral reference patterns. For example, during self-servo writing mode, read/write channel 320 may write servo sectors to the storage medium surface with the write elements of two heads in parallel. The servo pattern, including frequencies, servo track identifiers, burst patterns, and other data patterns, may be defined for the data storage device in firmware 312 and SSW pattern generator 328 may generate the corresponding write signal through preamps 322 and the target heads with position and timing based on SSW servo feedback. During parallel self-servo write, read/write channel 320 and/or servo controller 342 may determine head positions relative to a previously written self-servo write reference spiral and, as long as the head position is calculated to be within an acceptable error tolerance value of that reference spiral, write a next track of the servo pattern for the product using the active heads and corresponding storage medium surfaces. In some configurations, SSW pattern generator 328 may support generation and writing of interleaved servo patterns where servo wedges written to the pair of surfaces written in parallel are offset from one another, such as by half of the wedge-to-wedge timing. Interleaved servo patterns may support independent phase control between the SSW write pair, as further described below with regard to FIG. 3B.

Zone trim logic 332 may include special functions for addressing zone boundaries 366 and overwrite concerns that may result from writing over prior servo patterns during self-servo write. For example, rework of production servo patterns may result in residual patterns from prior iterations where a new pattern does not completely overwrite the prior pattern, particularly where exact registration may be difficult given the changing thermal characteristics and varying thermal compensation values. Subsequent servo zones may be written slightly shifted towards the ID and/or the OD than their target position. Therefore, parallel fill on the same surface for a second time may result in residual servo tracks from the prior run that would not be overwritten as outside the range of the new pattern. These residual tracks would appear at the zone boundaries or the ID and OD edges of each servo zone. Such duplicate tracks could confuse the servo controller during read/write mode. Zone trim logic 332 may include logic to write an erase band at the ID and OD edges of a servo sector write to assure that no residual pattern remains. The width of the erase band may be based on the maximum run-to-run thermal drift to assure that even a worse case change in thermal state between self-servo writes does not result in residual servo data and the unnecessary servo patterns are trimmed.

Preamp control logic 334 may include logic for selecting the target head or heads through preamps 322. For example, during read/write operating mode 316, a control signal may be sent to the preamplifier for the head bank that includes the target head and indicate the target head that will receive and generate read/write signals for the read/write operation. For example, preamp control logic 334 may generate one or more serial enable control signals to activate one or both preamplifiers. During self-servo write mode 314 using parallel servo write, preamp control logic 334 may be configured to send SSW head select signals 336 to two preamps in parallel. For example, the read/write selection control signal may be supplemented by a split signal and selection logic to direct the head selection control signal to both preamps.

Servo controller 342 may include one or more specialized circuits configured to process servo data, such as position error signals, from the disk surfaces and providing a control signal to position the actuators in a closed-loop control system. Servo controller 342 may also receive commands from processor 304 for positioning operations, such as seek, track follow, load, unload, sweep, idle, and other actuator positioning operations. Servo controller 342 may also implement servo error recovery processes for recovering from servo errors. Servo controller 342 may also operate during self-servo write mode 314 to provide position control relative to previously written spiral reference patterns for writing servo sectors 364. In some embodiments, servo controller 342 may include servo processor 344 and servo logic 346 (stored in a servo memory). For example, servo processor 344 may be a dedicated processor circuit and servo logic 346 may be firmware stored in RAM associated with the dedicated processor to provide dedicated computing resources for managing the servo functions. Servo controller 342 may receive servo read signals read from the disk surface using preamp 322 and provided to servo controller 342 through channel 320. Servo controller 342 may provide servo control signals to servo interface controller 348 for providing control signals to multiple motors and/or actuators. For example, servo controller 342 may provide control signals for a VCM and at least two actuators as described above with regard to FIG. 2.

In some configurations, servo logic 346 may include logic for operating differently between self-servo write mode 314 and read/write operating mode 316. For example, during self-servo write mode 314, servo logic 346 may implement SSW VCM logic 346.1, SSW head 1 logic 346.2, and SSW head 2 logic 346.3. Each head may be configured to track the spiral reference pattern on its corresponding disk surface for a track per inch (TPI) reference, noting that the different heads/disks may be configured for different target TPI values. SSW VCM logic 346.1 may include logic for determining VCM position adjustments based on the two PES received from the different heads. For example, VCM logic 346.1 may use one of the two heads as a master head and provide gross positioning to track on the master head. In another example, VCM logic 346.1 may use an average of the PES from the two heads. SSW head 1 logic 346.2 and SSW head 2 logic 346.2 may use the milli and micro actuator capabilities and corresponding direct current (DC) adjustment values to provide DC drift compensation up to the stroke distance of each milli actuator and micro actuator. SSW head 1 logic 346.2 and SSW head 2 logic 346.3 may include logic for using the PES from the respective heads and adjustments being made by VCM logic 346.1 to determine the position adjustments to be made to their respective actuators. For example, the micro actuator for each head 346.5 may receive a position compensation signal based on offsetting that head's PES based on the anticipated correction to the VCM position. In some configurations, the master or leading head may provide the DC and AC position control and the other head may follow using AC position control. In some configurations, SSW head 1 logic 346.2 and SSW head 2 logic 346.3 may also include logic for managing the relationship between their respective positions. For example, if the stroke distance limit of one of the actuators is reached, then the leading head may suspend writing for a revolution to allow the lagging head to catch up and get back within the range of its actuator. In some configurations, DC may be rejected on both heads simultaneously. For example, N % of track DC PES from one head may be subtracted from the PES of the other head to preserve equal and opposite DC PES on the two heads. In other examples, the milli actuator for each head 346.6 may receive a low frequency, including DC, position compensation signal to remove the two heads' PES offset based on half of the anticipated correction. The heads on the two banks move in opposite directions by half of the anticipated amount, thus forming a combined amount of offset removal.

Thermal drift logic 346.7 may include compensation logic for adjusting the positioning loop during self-servo write to compensate for relative changes in position between the parallel heads caused by thermal changes during self-servo write operations. While parallel filling servo patterns on two disk surfaces, the two heads and/or the reference spirals can slowly drift apart from each other due to thermal expansion from the head stack and/or disk stack and motor. Thermal drift logic 346.7 may compensate for the difference in head position from a nominal (start or cold) value to increasing compensation values as the device heats up by injecting the compensation value into the position control for the actuators. If the heads drift too far apart, the milli actuators and microactuators may not be able to compensate for the head position difference due to the limited actuator stroke distance. In some configurations, thermal drift logic 346.7 may ignore a portion of the PES and vary the amount ignored (compensation value) gradually over the SSW operations. So that the impact on track squeeze may be limited, the compensation value may vary slowly and, at each radial position, the compensation value may be a direct current (DC) or constant value referred to as PES DC bleed-out. During parallel fill, the radial location of any given servo track may depend on the thermal state and thermal history of the drive, as determined by the PES thermal compensation value.

Figure 3B:
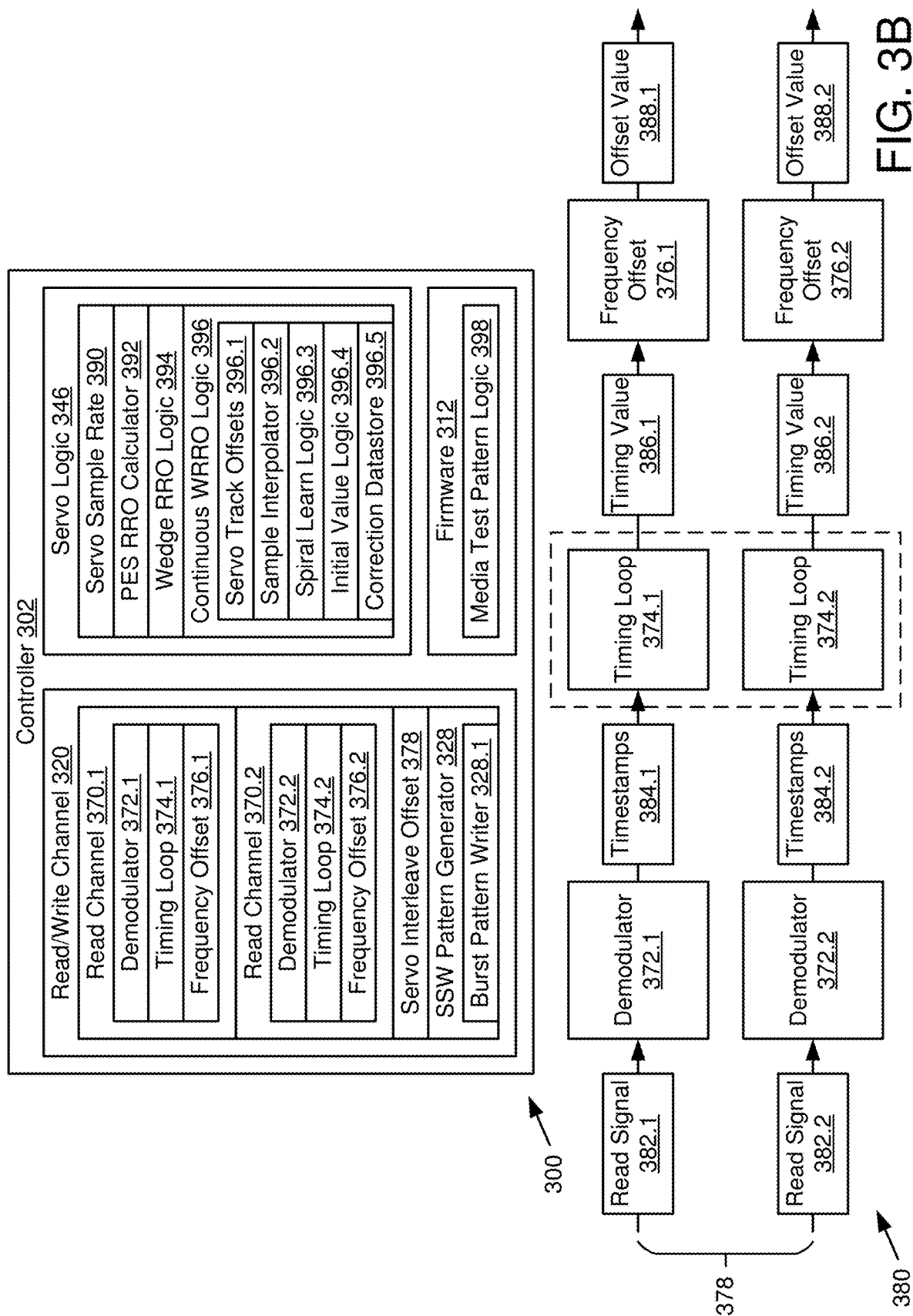
FIG. 3B is a block diagram of additional features for the configuration of data storage device shown in FIG. 3A to support interleaved servo patterns with independent phase control.

FIG. 3B shows additional features of controller 302 related to self-servo writing interleaved servo patterns written in parallel with independent phase control and wedge repeatable runout (WRRO) correction based on the interleaved servo patterns. For example, controller 302 may include additional logic in read/write channel 320 for independent phase control at a servo interleave offset using SSW pattern generator 328. Servo logic 346 may support additional features for WRRO correction learning and firmware 312 may include features for writing (and subsequently testing) media test patterns between the servo wedges.

As discussed above, read/write channel 320 may be configured with multiple read channels 370 to support TDMR. Each read channel 370.1 and 370.2 may include independent analog front ends that provide respective digital read signals to demodulators 372. Demodulators 372.1 and 372.2 may include logic that detects timestamps from the servo reference or servo format on the target storage medium surfaces. For example, demodulators 372 may detect the timestamp values from the read data based on adjacent pairs of servo address marks (SAM) along the servo or reference track, such as SAM2SAM timestamps. Demodulators 372 may provide the timestamps to timing loops 374 for each read channel 370. Each timing loop 374.1 and 374.2 may include logic to determine how the timestamp values from demodulators 372 vary from a target frequency for read channels 370. For example, each timing loop 374 may be embodied in firmware that determines a common component of the SAM2SAM timing and a current frequency difference value ($\delta$) from the common component. These timing values may be used by frequency offset calculators 376 to determine a frequency offset value for controlling the frequency of the next servo wedge to be written. For example, each frequency offset calculator 376.1 and 376.2 may include logic for using the frequency delta from the timing values to determine an offset value for adjusting the phase of the next segment of the servo pattern to be written and these determinations are made separately for the two heads. In some configurations, the offset values generated by frequency offset calculators 376 may set offset values in frequency offset registers used by the corresponding write channels for writing servo pattern segments. While read channels 370.1 and 370.2 may operate in parallel, they may be configured to operate at a servo interleave offset 378 from one another. For example, read channel 370.1 may determine the SSW phase control for one head/disk surface with a servo pattern that is offset by half of the wedge-to-wedge timing from the servo pattern for the head/disk surface being determined by read channel 370.2. The servo pattern on one disk surface will be offset or shifted relative to the servo pattern written in parallel on the other disk surface.

Blocks 380 further describe the flow of the parallel phase control for the interleaved servo patterns. Read signals 382.1 and 382.2 may be received by the respective read channels 370.1 and 370.2 from the head pairs targeted for parallel SSW via the two preamplifiers. Demodulators 372.1 and 372.2 may determine timestamps 384.1 and 384.2 from their respective read signals 382.1 and 382.2 and pass timestamps 384.1 and 384.2 to timing loops 374.1 and 374.2. Timing loops 374.1 and 374.2 may generate timing values 386.1 and 386.2 from timestamps 384.1 and 384.2 read from their respective disk surfaces and provide timing values 386.1 and 386.2 to frequency offset calculators 376.1 and 376.2. Frequency offset calculators 376.1 and 376.2 may use the timing difference from timing values 386.1 and 386.2 to determine offset values 388.1 and 388.2. Offset values 388.1 and 388.2 may update phase control values in frequency offset registers used to determine the phase of the next servo segment to be written to the respective disk surfaces. While this read signal processing occurs in parallel for the two different read channels, their operations are offset due servo interleave offset 378, which causes the servo wedges of one disk surface to be shifted out of alignment with the servo wedges on the other disk surface. The servo wedges of corresponding radial positions and sets of parallel written servo tracks on the two surfaces may align with the disk area between servo wedges on the other disk surface. Each servo wedge on one surface may be aligned between the respective positions of two adjacent servo wedges on the other surface.

In some configurations, the same SSW pattern generator 328 may be used to generate the servo pattern segments written by both heads. For example, SSW pattern generator 328 may generate different servo pattern segments for the parallel-written servo patterns on the two disks and generate them sequentially and alternatingly between the two heads/ surfaces. Burst pattern writer 328.1 may generate the burst patterns for each servo segment and switch between generating burst patterns written through one head and then written through the other head due to the interleaved offset between the two heads. Burst pattern writer 328.1 may allow the respective heads and write channels to write different burst patterns at the independently controlled phases to the different disk surfaces during parallel SSW operations.

Servo logic 346 may include logic for using position error signals (PES) to learn the wedge repeatable runout variations and calculate correction values for each servo wedge and track. For example, after the servo tracks are written through self-servo write operations, wedge repeatable runout learning operations may be used to calculate WRRO correction values for each servo wedge and track on two surfaces in parallel. More specifically, servo logic 346 may switch between servo data read from the two heads because of the interleaved servo patterns and process PES data from each to calculate their respective WRRO correction values during the same revolution of the disk stack (and, thus, both storage medium surfaces). Parallel TDMR servo read may enable the WRRO correction values to be learned in parallel and, accordingly, reduce test time during manufacturing and testing of TDMR data storage devices. The configuration of circuitry described herein that enables parallel SSW may also allow parallel processing of servo data from interleaved servo patterns without adding extra pins and lines for the channel or flex circuit or additional analog-to-digital converters or duplicate servo signal processing hardware. In some configurations, servo processor 344 and read/write channel 320 may support a servo sample rate 390. Servo sample rate 390 may be configured to be a multiple of the normal sampling rate for servo read operations, such as a double sampling rate for the servo read channel. Additionally, servo processor 344 and the firmware running on it may need sufficient processing speed to support the double sampling rate and parallel calculation of WRRO correction values. For example, the path length and microprocessor interrupt service routine (ISR) time must be capable of handling the required calculations.

Servo logic 346 may be configured to receive PESs for both TDMR heads from the corresponding servo read channels, where each PES represents an error or difference between the actual position of the head and the target position relative to the target servo track. PES repeatable run-out (RRO) calculator 392 may calculate repeatable runout or burst correction values from the PES for each sequential servo wedge along a servo track. RRO may represent incorrect radial positions of the servo bursts in each servo track and, more specifically, variations in the seam locations where phase-based servo bursts reverse polarity. These written-in errors (generated during SSW operations and also from the nature of the finite and uncertain/noisy number of magnetic grains per servo bit, because the state of the bits at the edges may be random) may be mapped and used to generate RRO correction values that can be applied by servo controller 342 during future servo positioning operations, including production data storage (read/write) operations. PES RRO calculator 392 may be configured to determine the RRO correction values sequentially and alternatively between the read signals from the two heads and their respective storage medium surfaces and servo patterns. In some configurations, wedge RRO logic 394 may include logic for calculating RRO correction values (using PES RRO calculator 392) at write or read track center. For example, WRRO logic 394 may use a single rotation to determine WRRO correction values for each head during a single rotation, but with potentially severe degradation off of track center. The interleaved servo pattern may allow the TDMR read channel (including two independent read channels) to time multiplex and decode PES from the two surfaces and heads in parallel.

Continuous WRRO logic 396 may improve WRRO correction values by using multiple values per servo track and, in some configurations, interpolation between those values, to provide a continuous range of correction values for off-track positions. Two-surface parallel learning may provide efficiency for learning WRRO on two surfaces (and corresponding heads) in parallel and use of continuous WRRO logic 396 may obviate concerns about data track alignment between those two surfaces or the impact of drift over temperature exceeding the stroke range of micro actuators. For example, continuous WRRO logic 396 may learn WRRO correction values at 4 equal distances per servo track. In some configurations, this learning may be executed using servo track follow (based on alignment with the NQ bursts in the servo burst pattern) or with circular track follow enabled. Continuous WRRO logic 396 may be configured for a plurality of servo track offsets 396.1 that determine the number of read operations and RRO correction values determined for each servo track, such as 2 or more offset positions. In some configurations, 4 offset positions based on quarter track offsets may provide a range of RRO correction values across the servo track width. In some configurations, continuous RRO logic 396 may be based on measuring PES RRO with circular track enabled at other offset values, including offset positions that are not whole numbers, such as 3.5 or 4.5 offset positions per servo track. More offset positions may increase the accuracy of WRRO correction values, but should be balanced with WRRO learn time and storage overhead for storing the larger number of correction values per servo track.

In some configurations, continuous WRRO logic 396 may include sample interpolator 396.2 configured to interpolate one or more values between each offset WRRO correction value. While interpolated values may not be as accurate as sampled values, they may be more accurate than correction based on a nearest WRRO correction value. For example, interpolated values may be determined based on averaging the adjacent pair of sampled offset WRRO correction values and/or a linear mapping of multiple interpolated values at increments along a line connecting the two adjacent offset values (as a function of off-track distance). In some configurations, the interpolated values may be calculated during the learning process in processing windows between the calculation of the PES RRO correction values and stored as additional WRRO values for the corresponding servo wedge and track segments. In some configurations, interpolated values may not need to be stored during WRRO learning and may be generated and stored later during the testing process or dynamically generated during run-time to save on WRRO storage overhead, assuming adequate processing speed for servo processor 344.

In some configurations, continuous WRRO logic 396 may include spiral learn logic 396.3 to progress through the WRRO learning operations using a spiral trajectory to move from revolution to revolution without seeking and settling between tracks. For example, spiral learn logic may set a spiral trajectory that moves the head by a quarter track offset (assuming an offset number of 4) for each revolution. Continuous track follow on a spiral trajectory eliminates seek-settle time between tracks and, because the learning is not dependent on the data track pattern, spiral learn logic 396.2 may be employed regardless of whether data is written in circular or spiral tracks. The per revolution movement along the spiral trajectory may be determined by dividing the servo track width by the number of offset positions (which need not be a whole number).

In some configurations, continuous WRRO logic 396 may include initial value logic 396.4 configured to use WRRO information from prior revolutions for the servo segment corresponding to that servo wedge and track. For example, using four servo track offsets, the WRRO error or correction values from a prior rotation may be used to set the WRRO learn initial value, such as the pass at WRRO offset 1/4 providing an initial value for the learning the WRRO correction value at WRRO offset 2/4. Sequential WRRO passes (each rotation) may be noted as $WRRO\_i\_1/N$, $WRRO\_i\_2/N$, $WRRO\_i\_3/N$, to $WRRO\_i\_N/N$ based on the number of offsets (N) per servo track for track i. The current track i's WRRO initial value (for that wedge segment) may be $WRRO\_i\_1/N\_init$, $WRRO\_i\_2/N\_init$, $WRRO\_i\_3/N\_init$, $WRRO\_i\_4/N\_init$. Using multiple sequential WRRO track offsets for learning (1, 2 . . . N) results in:

$$WRRO\_i\_3/N = alpha1*WRRO\_i\_1/N + alpha2*WRRO\_i\_2/N$$

$$WRRO\_i\_4/N = alpha1*WRRO\_i\_2/N + alpha2*WRRO\_i\_3/N$$

$$WRRO\_i+1\_2/N = alpha1*WRRO\_i\_N/N + alpha2*WRRO\_i+1\_1/N(\text{next track})$$

In some configurations, a least squares solution for alpha1 and alpha2 can be obtained from the above equations. After this training or learning step, alpha1 and alpha2 may be used to determine the WRRO correction initial value using the neighboring (prior) WRRO correction values. For example, for track j offset 3/N, $WRRO\_j\_3/N\_init = alpha1*WRRO\_j\_1/N + alpha2*WRRO\_j\_2/N$ and then learn the $WRRO\_j\_3/N$ using conventional WRRO function processing based on the PES RRO.

In some configurations, servo logic 346 may include or access a correction datastore 396.5 configured to store the WRRO correction values determined during the WRRO learning operations. For example, correction datastore 396.5 may include one or more data structures and/or parameters and functions stored in non-volatile memory accessible to servo processor 344 and retrieved during runtime servo operations to provide WRRO correction values during track follow operations. In some configurations, correction datastore 396.5 may include a set of WRRO correction values mapped to servo track addresses used to identify servo track and wedge for each WRRO correction value. Correction datastore 396.5 may include a number of values corresponding to servo track offsets 396.1 for each servo track and wedge. In some configurations, correction datastore 396.5 may include one or more interpolated values (generated by sample interpolator 396.2) between the WRRO correction values determined for each read offset in the set of correction values stored for each servo track and wedge.

In some configurations, WRRO learning operations may be combined with writing of media test patterns to further increase the efficient use of test time during the storage device manufacturing process. For example, media test patterns may be written to the data areas of the storage medium between the servo wedges in the same rotations that are used to read the servo segments for WRRO learning. Firmware 312 may include media test pattern logic 398 configured to write predetermined test patterns to the data areas of the storage medium to support additional media testing, characterization, and/or mapping of defects for determining data track formats. For example, media test pattern logic 398 may be configured to write one or more tone patterns to the areas between servo wedges. Media test pattern logic 398 may include logic for both writing tone scan patterns to the storage medium and conducting tone scan read operations subsequent to writing the tone scan patterns. In some configurations, tone scan patterns may be written in a different (fewer) number of revolutions than are used for WRRO learning. For example, tone patterns may be written in 1 or 2 rotations per servo track, as opposed to 4 or more rotations per servo track for WRRO offsets of 4 or more. In the example of four WRRO learning offsets and two test pattern write passes per servo track, four rotations may be used for each servo track, with WRRO learning read operations in each rotation and tone scan pattern writing in every other rotation. By alternating each pass between test pattern writes on one surface and then the other surface of the interleaved servo surfaces, media test patterns written at half servo track increments may be written to both surfaces in the four passes used for the WRRO learning. Where the media test pattern is written once per servo track, the media test pattern write may alternate between passes in which only WRRO read operations occur and where test pattern writes are made to one or other of the interleaved storage medium surfaces. Media test pattern logic 398 may include multiple tone scan patterns that alternate, such as dual frequency media test patterns. For example, media test pattern logic 398 may write a first tone scan pattern at one servo track and a second tone scan pattern at the next servo track, and alternate between them across the servo tracks. Example configurations for combining WRRO learning operations with media test pattern writing are further described below with regard to FIGS. 7A-7D.

In some configurations, the WRRO learn track pitch (the servo track pitch divided by number of WRRO learning offsets) may be narrower than the write width of the target heads to assure that the tone scan patterns cover all media areas between the servo wedges. During subsequent tone scan read operations, the tone signal may be read from the interleaved surfaces in parallel using single reader operations similar to those used for SSW operations, though without TDMR servo and TDMR WRRO. To use TDMR servo and TDMR WRRO during tone scan reads, one surface may be read at a time using the full TDMR capabilities of the target head and TDMR read channel. In some configurations, tone scan read revolutions may also be used for additional WRRO learning operations. For example, the WRRO correction values learned during the tone scan write operations may be updated based on additional passes read samples during the tone scan read passes. In configurations where spiral trajectory WRRO learning is used with dual frequency media test patterns, the tone scan read may also need to follow the spiral trajectory. In some configurations, media test patterns may include tone scan patterns written at the same frequency on each pass/servo track and phase aligned at every half-track or one-track spacing. This phase aligned tone scan pattern may allow tone scan read to be done at any position (and regardless of circular or spiral trajectory), with sufficient phase control during the test pattern write. Where the tone scan pattern is phase-aligned, such as when using bit patterned media recording and corresponding media, head, and channel capabilities, data patterns may be written phase-aligned.

Figure 4A:
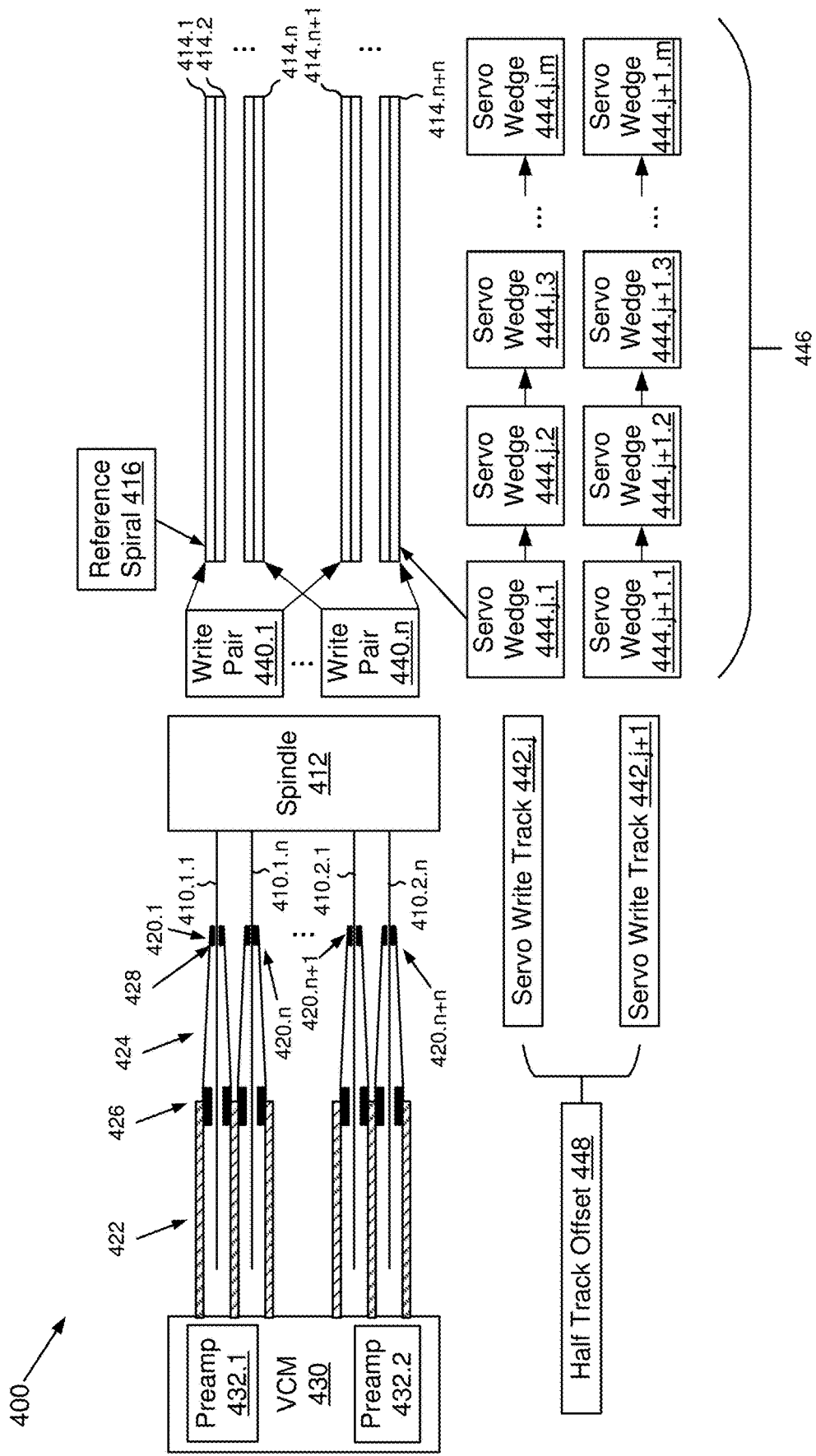
FIG. 4A is a diagram showing parallel self-servo writing using two head banks with corresponding preamplifier circuits.

FIG. 4A shows a parallel self-servo writing process 400 for a data storage device having two head banks and corresponding preamplifier circuits. A storage media stack includes disks 410 arranged in two banks around a spindle 412. The upper bank includes disk surfaces 410.1.1-410.1.$n$ and the lower bank includes disk surfaces 410.2.1-410.2.$n$. Each disk includes two storage medium surfaces 414 for magnetically recording data on the opposing (upper and lower) surfaces of the disk. A head 420 is actuated over each surface and suspended by a corresponding suspension 424. Each suspension 424 may include a fixed portion attached to arm 422 and a flexible portion extending toward the corresponding disk surface. In some configurations, an actuator 426, such as a piezoelectric milli actuator may be positioned at the junction of the fixed portion of the suspension portion and operable for lateral positioning of suspension 424. In some configurations, a second actuator 428, such as a piezoelectric micro actuator, may be positioned proximate head 420 at the distal end of suspension portion 424 and operable for further lateral positioning. Due to both the size of the actuators and their relative distances from the head, arm actuator 426 that moves suspension portion 424 of arm 422 may have a greater stroke distance or range than head actuator 428 adjacent head 420, but head actuator 428 may have greater precision for fine positioning of the read/write elements over the desired location on the disk. Additionally, in SSW mode, the arm actuator 426 for the parallel write head banks can only be controlled to move in opposite directions, making it useful for correcting the DC and low-frequency offsets between the two heads. The head actuator 428 on the other hand, having a more limited move range, is individually controlled by bank, making it capable of correcting not only the lower frequency errors, including offsets, but also the higher frequency errors for accurate servo pattern placement at the desirable place. Heads 420 and corresponding suspension 424 are similarly arranged in banks. The upper bank may include heads 420.1-420.$n$ and their corresponding arms 422 and the lower bank may include heads 420.$n$+1-420.$n$+n. Each bank of heads is electrically connected to a corresponding preamplifier circuit, such as preamp 432.1 for the upper head bank and preamp 432.2 for the lower head bank. In some configurations, one preamp bank may have more heads than the other preamp bank and, in such configurations, parallel self-servo write and other parallel operations may be used across paired subsets of the two banks and the excess head/surfaces may be written using single head/surface self-servo write. For example, if one head bank that has n heads and the other has n+x heads, a max number of n heads can do self-servo write or WRRO learn in parallel using the methods described herein and the remaining x heads on the second stack may be written and configured using single head operations.

During parallel self-servo write, the control circuitry uses reference spiral 416 from the storage medium surface to provide position information for writing the servo sectors or servo wedges. Reference spiral 416 may be a previously written spiral reference pattern and be present on each disk surface when writing of the servo sectors is initiated. Heads 420.1-420.$n$ may be used to write the servo sectors on the upper bank of disks in parallel with heads 420.$n$+1-420.$n$+n writing the servo sectors on the lower bank. Due to the mechanics of the disk stack and the head stack, it may be preferable to parallel write with head pairs that minimize the vertical distance between heads. In some configurations, write pairs 440.1-440.$n$ are selected to pair the writing with heads/surfaces in the same sequential position in each head bank. For example, head 420.1 writing to surface 414.1 would be paired with head 420.$n$+1 writing to surface 414.$n$+1 as write pair 440.1. Each surface may be written sequentially down to head 420.$n$ writing to surface 414.$n$ and head 420.$n$+n writing to surface 414.$n$+n as write pair 440.$n$. In some configurations, write pairs 440 may be selected in a different order, rather than top to bottom. Other pairings are also possible, such as nearest pairs to farthest pairs, or parings of top surface heads from one bank with bottom surface heads from the other bank. As each pair is selected, servo tracks may be written in two passes (rotations or revolutions of disks 410) as servo write track 442.$j$ and 442.$j$+1, where servo wedges 444.$j$.1-444.$j$.m are written in sequence on both disk surfaces at the same time. The pair of heads are moved by a half-track offset 448 between passes and the second pass of servo write track 442.$j$+1 may write the other half of the servo sector to the same sequence of servo wedges 444.$j$+1.1-444.$j$+1.$m$. In the example shown, each servo track 446 is written in two passes along the sequence of servo wedges for a complete revolution, where m is the number of servo wedges in the servo format. In some configurations, when wiring preamps to their respective head banks, neighboring heads may be wired to alternative preamps for minimizing read/write cross-talk and so that write pairs for parallel fill are two heads away, making them closer, with less cross-head motion.

Figure 4B:
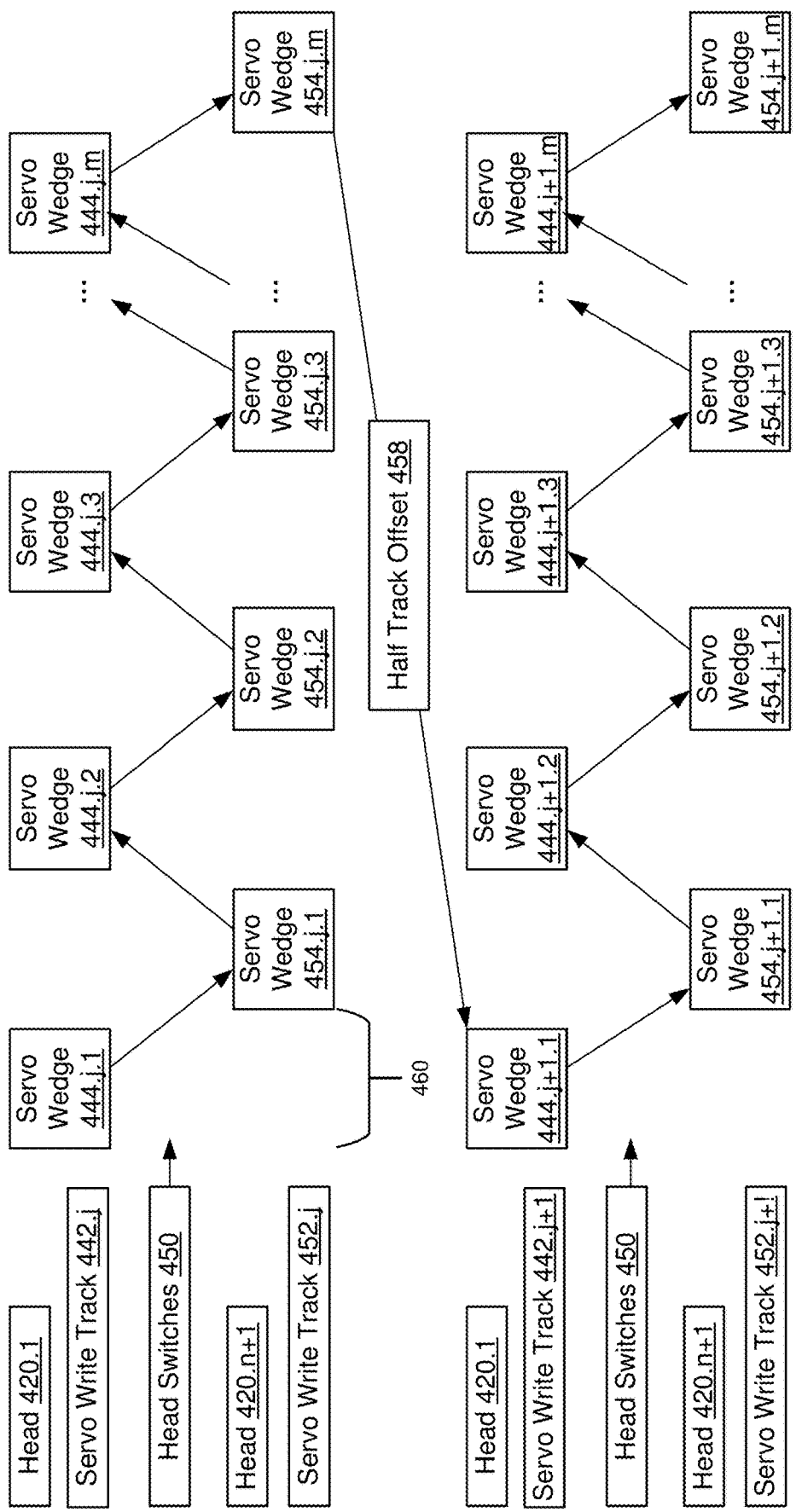
FIG. 4B is a diagram showing self-servo writing using the two head banks of FIG. 4A to write interleaved servo patterns.

FIG. 4B shows a diagram of writing interleaved servo patterns in parallel across head/media pairs. For example, servo tracks 446 may be written using a selected head pair, such as head 420.1 and 420.$n$+1 from the two head banks, as shown in FIG. 4A with an interleaved servo pattern offset 460 to support independent phase control between the parallel written servo patterns. During SSW operations, head 420.1 and 420.$n$+1 may be selected as target heads for parallel SSW using the drive circuitry, including the TDMR channels. Servo track write 442.$j$ for the first half of the servo segments may be initiated for head 420.1 in parallel (the same media stack rotation) with servo track write 452.$j$ for the first half of the servo segments for head 420.$n$+1. Head 420.1 may write a half servo segment for servo wedge 444.$j$.1, then head switch 450 during offset 460 may allow head 420.$n$+1 to write a half servo segment for servo wedge 454.$j$.1. Another head switch in the interval of the next offset period may return write control to head 420.1 to write the first half segment of servo wedge 444.$j$.2. This pattern may continue for the parallel SSW of the first half segments of servo wedges 454.$j$.2, 444.$j$.3, 454.$j$.3, and so on switching between heads 420.1 and 420.$n$+1 during offset intervals until the last servo wedges of the rotation are reached at servo wedges 444.$j$.m and 454.$j$.m.

Once the revolution is complete, servo control may shift heads 420.1 and 420.$n$+1 by half track offset 458 to write the second halves of each servo segment for the respective servo tracks using write track 442.$j$+1 and 452.$j$+1 in the next rotation of the media stack. Head 420.1 may write the second half servo segment at servo wedge 444.$j$+1.1, then head switch 450 during offset 460 to allow head 420.$n$+1 to write the second half servo segment at servo wedge 454.$j$+1.1. Another head switch in the interval of the next offset period may return write control to head 420.1 to write the second half segment at servo wedge 444.$j$+1.2. This pattern may continue for the parallel SSW of the second half segments at servo wedges 454.$j$+1.2, 444.$j$+1.3, 454.$j$+1.3, and so on switching between heads 420.1 and 420.$n$+1 during offset intervals until the last servo wedges of the rotation are reached at servo wedges 444.$j$+1.$m$ and 454.$j$+1.$m$. The servo track may then be complete and another half track offset may position the heads for a next rotation to start the next servo track in the servo zone, continuing the respective servo wedges at interleaved servo pattern offset 460 on the paired disk surfaces. In another configuration, instead of employing half track offset 458 between the first half tracks 442.*j* and 452.*j* and the second half tracks 442.*j*+1 and 452.*j*+1, each servo wedge on each of the parallel writing surfaces is written with an offset of 0.5 track divided by the number of wedges per revs, creating a spiral product servo pattern with a slope of one track per revolution. Because half track offset 458 is spread to all the wedges via a constant velocity motion instead of having a seek/settle process to achieve, the time cost to write the servo pattern is lower.

Figure 5A:
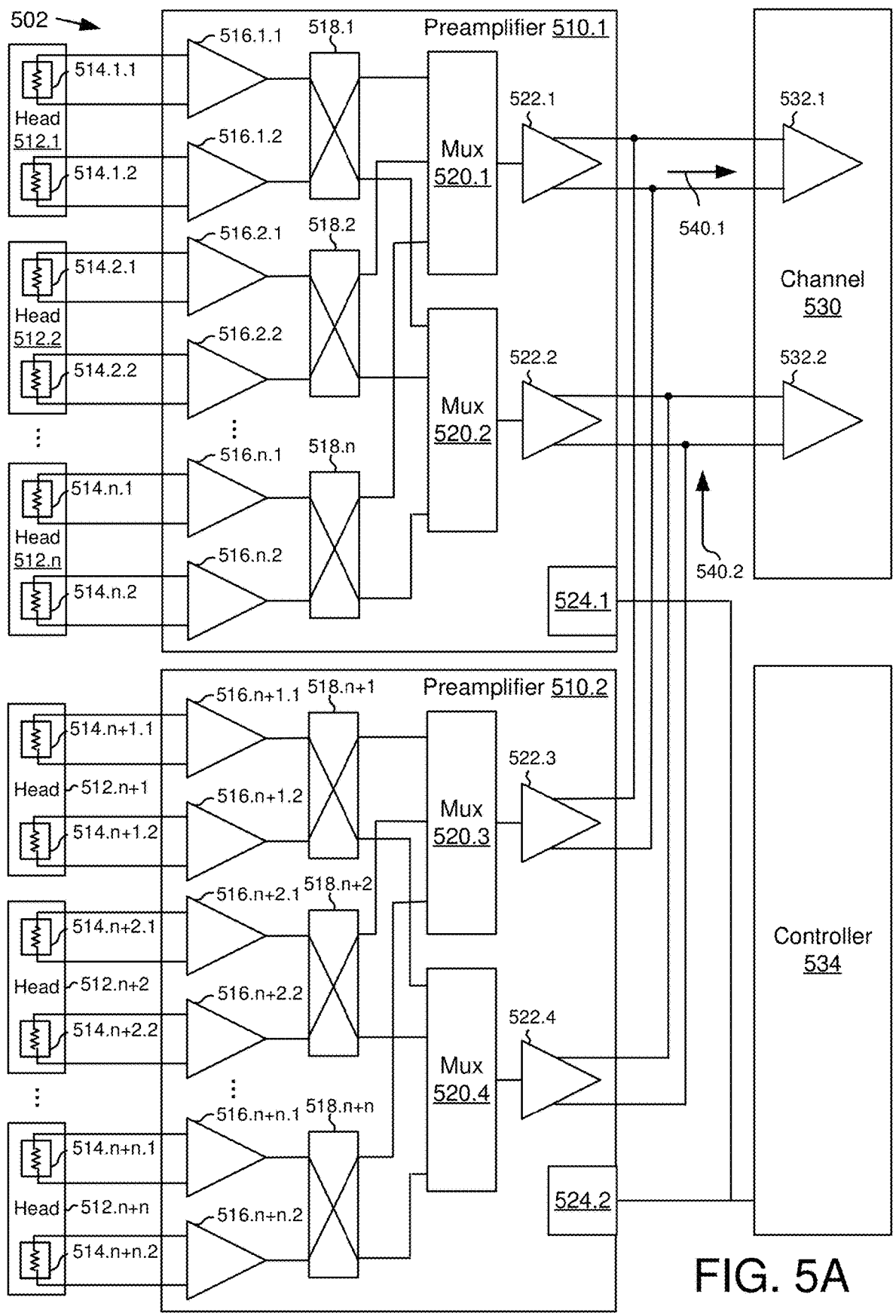
FIGS. 5A and 5B are example preamplifier configurations for parallel self-servo write using TDMR heads.

As shown in FIGS. 5A-5D, a number of example preamplifier configurations and adjacent circuitry may be used for parallel self-servo writing. In FIG. 5A, an example configuration 502 includes preamplifier circuits 510.1 and 510.2. Preamplifier circuit 510.1 is electrically connected to a bank of TDMR heads 512.1-512.*n*. Each TDMR head 512 includes two read elements 514 that are electrically connected to the input interfaces of corresponding sensor amplifiers 516. For example, read elements 514.1.1 and 514.1.2 are connected to sensor amplifier 516.1.1 and 516.1.2 respectively, read elements 514.2.1 and 514.2.2 are connected to sensor amplifier 516.2.1 and 516.2.2 respectively, and read elements 514.*n*.1 and 514.*n*.2 are connected to sensor amplifier 516.*n*.1 and 516.*n*.2 respectively. Preamplifier circuit 510.2 is electrically connected to another bank of TDMR heads 512.*n*+1-512.*n*+n. Read elements 514.*n*+1.1 and 514.*n*+1.2 are connected to sensor amplifier 516.*n*+1.1 and 516.*n*+n.2 respectively, read elements 514.*n*+2.1 and 514.*n*+2.2 are connected to sensor amplifier 516.*n*+2.1 and 516.*n*+2.2 respectively, and read elements 514.*n*+n.1 and 514.*n*+n.2 are connected to sensor amplifier 516.*n*+n.1 and 516.*n*+n.2 respectively.

In preamplifier circuits 510.1 and 510.2, sensor amplifiers 516 are connected in pairs to A and B swap circuits 518 configured to swap the amplified read signals from the corresponding read elements to connect to opposite multiplexors 520. For example, amplified read signals from sensor amplifiers 516.1.1 and 516.1.2 are swapped through swap circuit 518.1 to connect the read signal from sensor amplifier 516.1.1 to multiplexor 520.2 and the read signal from sensor amplifier 516.1.2 to multiplexor 520.1. Similar configurations operate for sensor amplifiers 516.2.1 and 516.2.2 through swap circuit 518.2 and sensor amplifiers 516.*n*.1 and 516.*n*.2 through swap circuit 518.*n*. Preamplifier circuit 510.2 is configured similarly for sensor amplifiers 516.*n*+1.1 and 516.*n*+1.2 through swap circuit 518.*n*+1, sensor amplifiers 516.*n*+2.1 and 516.*n*+2.2 through swap circuit 518.*n*+2, and sensor amplifiers 516.*n*+n.1 and 516.*n*+n.2 through swap circuit 518.*n*+n.

Multiplexors 520 may be circuits configured to select among amplified read signals to selectively connect them to read drivers 522 that interface with read channels 532 of channel 530. In some configurations, multiplexors 520 may select the target head and corresponding read sensors based on a control signal received at corresponding control signal inputs 524. During data read/write operation, the pair of read signals from the pair of read elements in the target head may be selected by multiplexor 520.1 and 520.2 and passed to read drivers 522.1 and 522.2 respectively. During self-servo write operation, only one of multiplexors 520.1 and 520.2 may be enabled and select a single read signal from the target head to provide to one of read driver 522.1 or 522.2. Preamplifier 510.2 may be similarly configured such that preamplifiers 510.1 and 510.2 may be activated alternatingly as needed for reading from both read elements of a target head in their head bank. During self-servo write operation, only one of multiplexors 520.4 or 520.3 may be enabled and select a single read signal from the parallel target head to provide to one of read drivers 522.4 or 522.3. The corresponding read driver 522 associated with the active multiplexor may provide the amplified read signal through an interface to read channel inputs 532 in channel 530. In the example shown, during a self-servo write operation, multiplexor 520.1 provides the amplified read signal from a target head connected to preamplifier 510.1 to read driver 522.1 to provide a read signal 540.1 to read channel input 532.1, and multiplexor 520.4 provides the amplified read signal from a target head connected to preamplifier 510.2 to read driver 522.4 to provide a parallel read signal 540.2 to read channel input 532.2.

During self-servo write operation, read channel 530 may be configured to decouple the received read signals 540.1 and 540.2 and process them separately to determine their respective servo position information and PES. For example, the analog front end of channel 530 may include separate variable gain amplifiers (VGA) configured to receive the pair of read signals through read channel inputs 532.1 and 532.2 and direct them through separate read processing channels to extract servo information from the respective read signals. In some configurations, read channel 530 may be configured similarly to read/write channel 320 in FIG. 3.

In some configurations, head selection and preamplifier control may be managed by controller 534, such as a hardware controller configured similarly to controller 302 in FIG. 3. Controller 534 may generate preamplifier control signals and send them to control signal inputs 524.1 and 524.2 for controlling preamplifier circuits 510.1 and 510.2 respectively. During read/write operations, controller 534 may send a control signal to the active preamplifier connected to the target head for the read write operation and the lack of a control signal to the other preamplifier may effectively disable it for read/write operations when the other preamplifier is active. During parallel self-servo write operations, both preamplifiers 510 may need to be active and receive parameters for selecting the target head, read sensor, and read path (multiplexor to read driver to read channel input). For example, controller 534 may be configured to generate a pair of preamplifier control signals to send simultaneously to control signal inputs 524.1 and 524.2 to set the corresponding preamplifier parameters, though they may be different for each preamplifier. In some configurations, controller 534 may include native logic for generating the parallel control signals for parallel control of preamplifier circuits 510.1 and 510.2 during self-servo write operation.

Figure 5B:
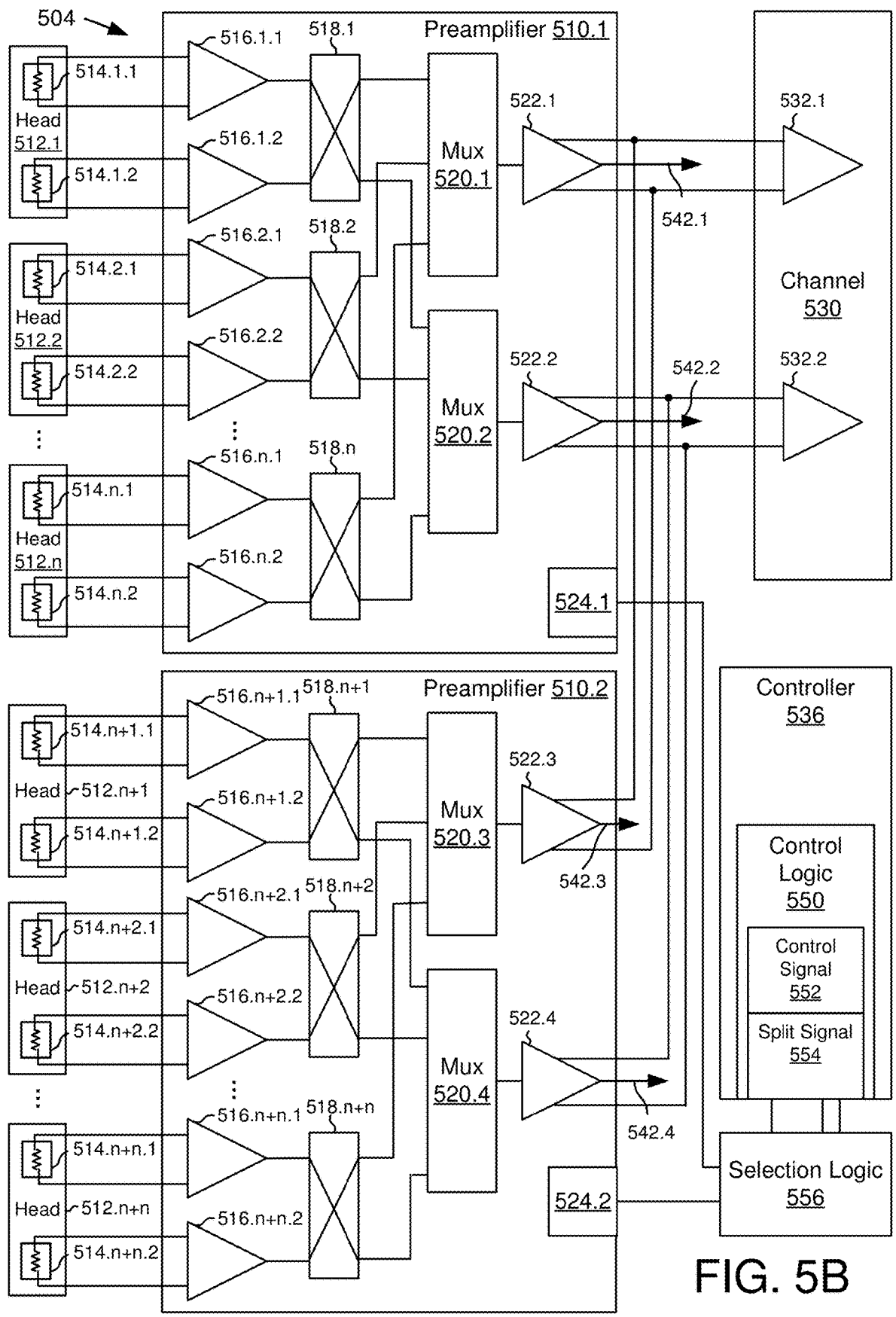

FIG. 5B shows an alternative example of configuration 504 using preamplifier circuits 510.1 and 510.2. Preamplifier circuits 510.1 and 510.2, their corresponding heads 512, and channel 530 are configured as described for FIG. 5A. In this example, preamplifier circuits 510.1 and 510.2 may be operating in read/write operating mode. When a target head is selected in the head bank including heads 512.1-512.*n*, multiplexors 520.1 and 520.2 may select the amplified read signals from the pair of read sensors on that head and direct them to read drivers 522.1 and 522.2. TDMR read signals 542.1 and 542.2 may be sent to channel inputs 532.1 and 532.2 and the corresponding coupled TDMR read channels for processing position information (and stored data) from those signals. When a target head is selected in the head bank including heads 512.*n*+1-512.*n*+n, multiplexors 520.3 and 520.4 may select the amplified read signals from the pair of read sensors on that head and direct them to read drivers 522.3 and 522.4. TDMR read signals 542.3 and 542.4 may be sent to channel inputs 532.1 and 532.2 and the corresponding coupled TDMR read channels for processing position information (and stored data) from those signals.

In configuration 504, an alternative controller 536 is shown that does not include native generation of parallel preamplifier control signals to control signal inputs 524.1 and 524.2. Controller 536 may otherwise be configured similarly to controller 302 in FIG. 3. Controller 536 may include control logic 550 that may include firmware instructions for selectively initiating control signal generator 552 to generate the data read/write operation control signal that is selectively sent to control signal input 524.1 (when preamplifier 510.1 is active) or control signal input 524.2 (when preamplifier 510.2 is active). Control logic 550 may include additional split signal generator 554 to generate additional split signals to initialize selection logic 556 to generate parallel preamplifier control signals to control signal inputs 524.1 and 524.2. Further description of an example selection logic circuit 590 is provided below with reference to FIG. 5D.

Figure 5C:
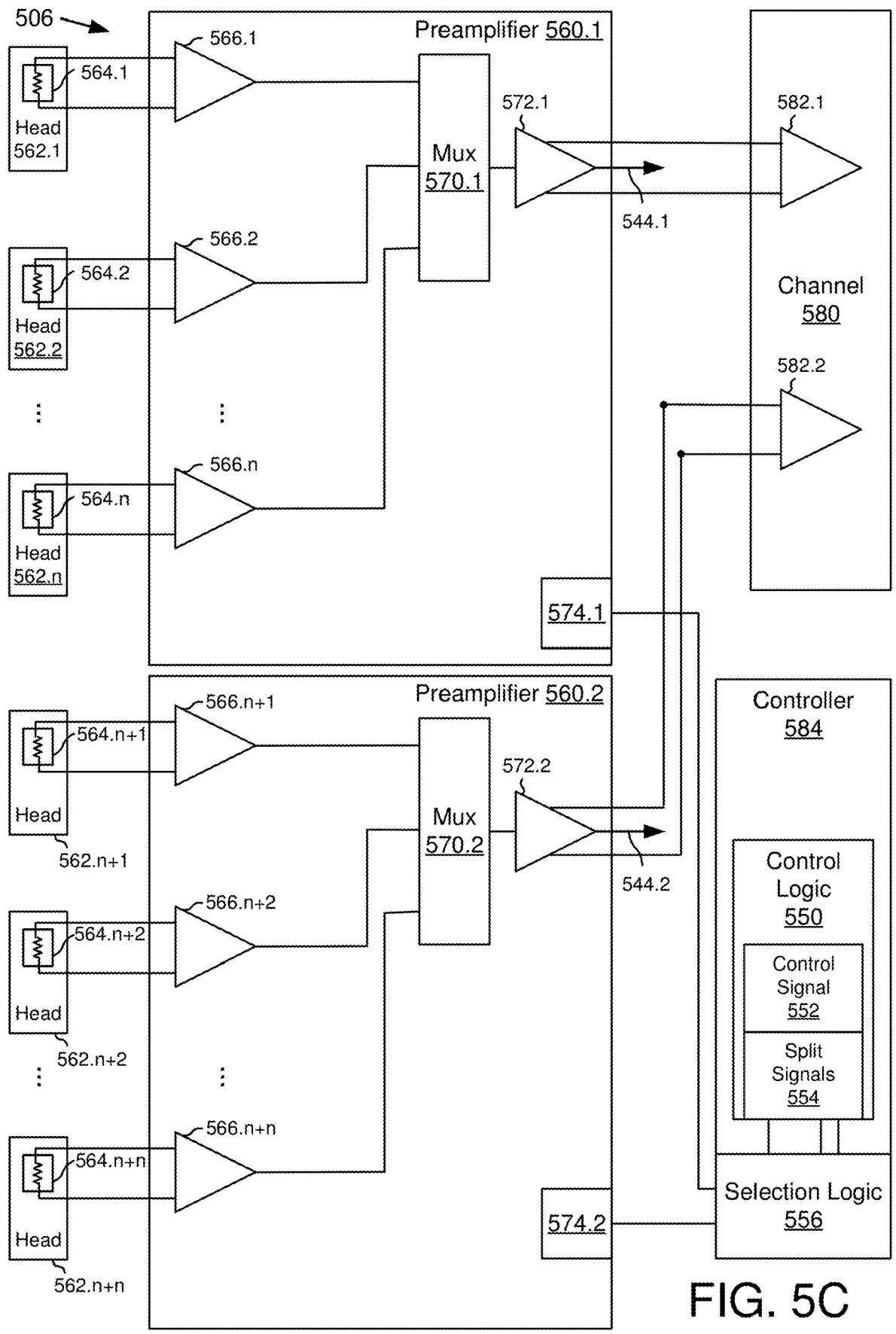
FIG. 5C is an example preamplifier configuration for parallel self-servo write using single reader heads.

FIG. 5C shows an alternative example configuration 506 using non-TDMR heads and preamplifiers for parallel self-servo write. Preamplifier circuits 560.1 and 560.2 are configured with a single sensor amplifier 566 to the single read sensor 564 on each head 562. For example, preamplifier circuit 560.1 supports a head bank including heads 562.1-562.$n$ and receives read signals from corresponding read sensors 564.1-564.$n$ through sensor amplifiers 566.1-566.$n$. Preamplifier circuit 560.2 supports another head bank that includes heads 562.$n$+1-562.$n$+n and receives read signals from corresponding read sensors 564.$n$+1-564.$n$+n through sensor amplifiers 566.$n$+n-566.$n$+n. Preamplifier circuits 560.1 and 560.2 each include only a single multiplexor 570 and read driver 572 for selecting and providing the read signal from the target head to a read channel input 582 of channel 580. For example, each sensor amplifier 566.1-566.$n$ connects to multiplexor 570.1 to selective connection to read driver 572.1 and each sensor amplifier 566.$n$+1-566.$n$+n connects to multiplexor 570.2 to selectively connect to read driver 572.2. Preamplifier circuits 560.1 and 560.2 may also include control signal inputs 574.1 and 574.2 respectively for receiving preamplifier control signals to select the active preamplifier and head for read/write operations and activate both preamps and select target heads for parallel self-servo write. During read/write operating mode, read drivers 572.1 and 572.2 may alternatingly send read signals 544.1 and 544.2 to corresponding read channel inputs 582.1 and 582.2 for processing through a corresponding read channel. During parallel self-servo write mode, read drivers 572.1 and 572.2 may send read signals 544.1 and 544.2 in parallel to corresponding read channel inputs 582.1 and 582.2 for processing through decoupled read channels for extracting position information. Additional traces for the parallel read signals may be provided on the flex circuit (not shown) between read drivers 572 and read channel inputs 582.

In configuration 506, channel 580 includes separate read channel inputs 582.1 and 582.2, similar to the TDMR read channels in FIGS. 5A and 5B. Controller 584 may be configured similarly to controller 536 in FIG. 5B and include similar control logic 550 interfacing with selection logic 556 for controlling the two preamplifier modes through control signal inputs 574.1 and 574.2. We note here that configuration 506 is the non-TDMR version of configuration 504. The non-TDMR version of configuration of 502 is omitted here for brevity. One can change controller 584 in FIG. 5C with a controller like 534 to establish the non-TDMR version of configuration 502.

Figure 5D:
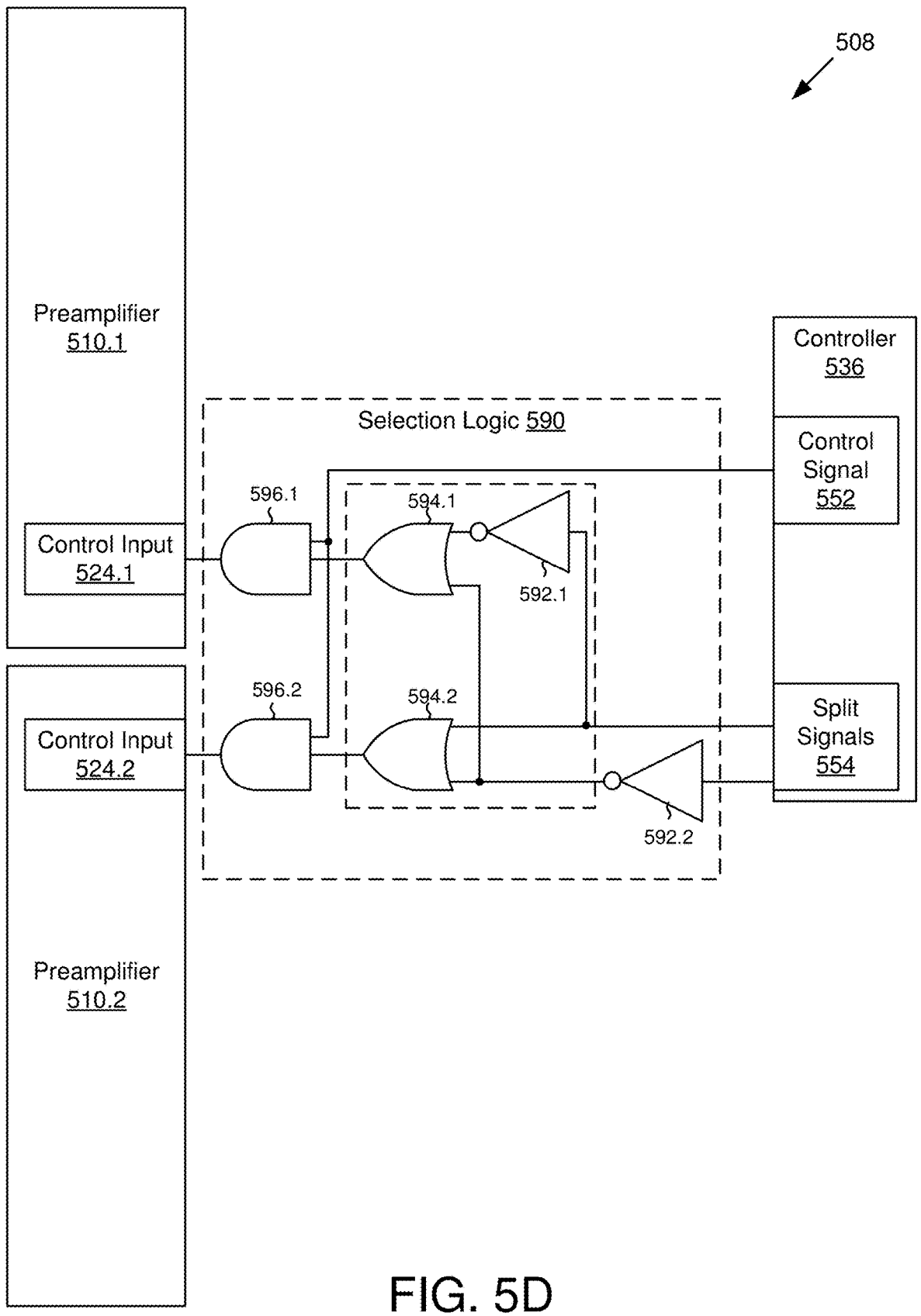
FIG. 5D is example selection logic for controlling preamplifier circuits to switch between self-servo write mode and read/write operating mode.

FIG. 5D shows an example selection logic circuit 590, such as may be used in configurations 504 and 506. The example configuration 508 is in the context of a configuration similar to configuration 504. Preamplifier circuits 510.1 and 510.2 are controlled through corresponding control signal inputs 524.1 and 524.2. Controller 536 includes control signal generator 552 and split signals generator 554. In the configuration shown, control signal generator 552 generates a read/write operation (single active preamplifier and head) control signal, such as a serial enable control signal, and provides it into selection logic 590, and split signals generator 554 may generate a pair of control signals for splitting the preamplifier control signal and providing selected control signals to the respective control signal inputs 524.1 and 524.2 in parallel. For example, the pair of signals generated by split signals generator 554 may include a head selection signal for preamplifier circuit 510.2, such as a second serial enable control signal, and a split signal selection signal to direct the control signal from control signal 552 to preamplifier circuit 510.1 in parallel. The control signals generated by control signal generator 552 and split signals generator 554 may be received by selection logic 590. In some configurations, selection logic circuit 590 may include hardware logic added to controller 536 or be provided as a separate device or portion of the flex circuit between controller 536 and preamplifier circuits 510.1 and 510.2.

Selection logic circuit 590 may comprise a pair of not gates 592.1 and 592.2 for the control signals from split signals generator 554. Not gates 592 may control the selection of control signals sent to or gates 594.1 and 594.2. Or gate 594.1 may evaluate the pair of not gate signals from 592.1 and 592.2 and or gate 594.2 may evaluate the selection signal for preamplifier circuit 510.2 versus the signal from not gate 592.2. And gates 596.1 and 596.2 may determine the control signals selectively sent to control signal inputs 524.1 and 524.2 respectively. And gates 596.1 and 596.2 may provide the single preamplifier/head selection control signal from control signal generator 552 during read/write operations or provide modified control signals based on or gates 594.1 and 594.2 respectively during parallel self-servo write operation. Other configurations of selection logic circuit 590 are possible. During parallel self-servo writing, the read signals from two heads go to each TDMR channel and are processed in parallel to generate the offtrack position controls and down track timing controls. The write signal is time multiplexed to the two heads, i.e., there is a write head switch to write on the first surface and then to the second surface, creating the interleaved written pattern having half a wedge offset in the down track directions.

Figure 6A:
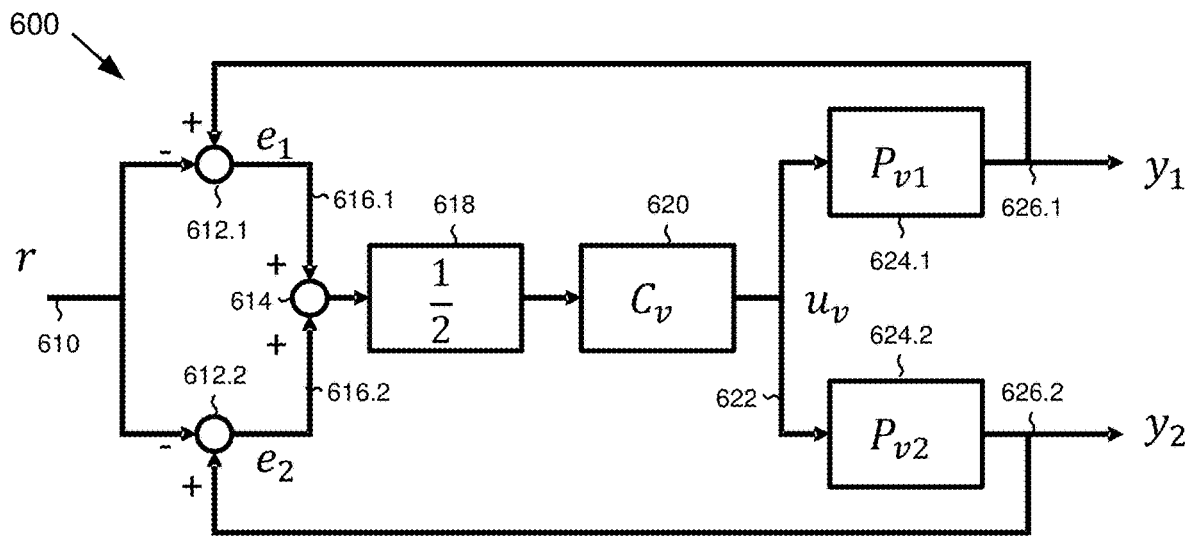
FIGS. 6A and 6B are example logic for determining servo control signals for parallel self-servo writing.

FIG. 6A shows example VCM compensator logic 600 that may determine the gross VCM position adjustment 622 based on per head position measurements 626. A reference position 610 may be subtracted from the first head position measurement 626.1 at the summing junction 612.1 to form the first head PES 616.1. Similarly, a reference position 610 may be subtracted from the second head position measurement 626.2 at the summing junction 612.2 to form the second head PES 616.2. The per head PES 616 may be added together at the summing junction 614 and divided by 2 by the gain 618 to get the average PES, which may in turn be run through a VCM compensator 620 to get the gross VCM position adjustment 622. The gross VCM position adjustment 622 may be applied to the motor control circuit to simultaneously change the first head position 626.1 and second head position 626.2 respectively via the VCM and first arm dynamics 624.1 and the VCM and second arm dynamics 624.2]

Figure 6B:
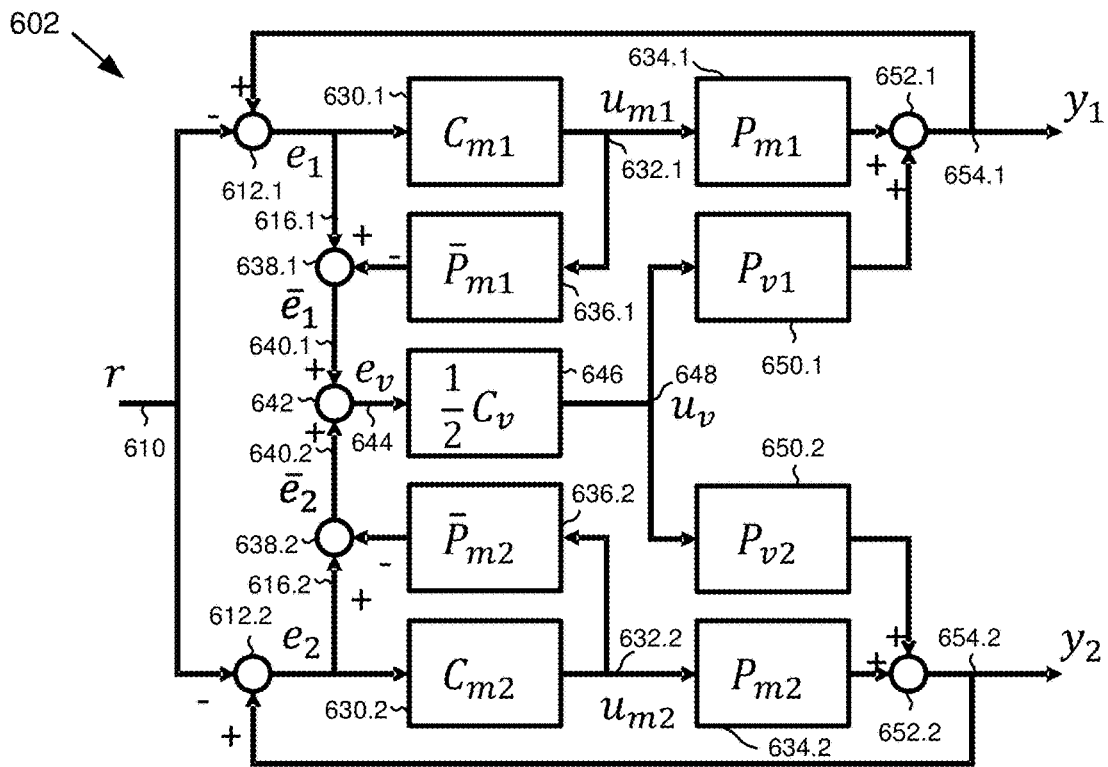

FIG. 6B shows another example compensator logic 602 that may determine the per head actuator compensation values 632 and the gross VCM position adjustment 648 based on per head position measurements 654. A reference position 610 may be subtracted from the first head position measurement 654.1 at summing junction 612.1 to form the first head PES 616.1. The first head PES 616.1 may be run through a first actuator compensator 630.1 to produce a first actuator compensation value 632.1. The first actuator compensation value 632.1 may be run through a first actuator model 636.1 to produce an estimated first actuator position, which may be in turn subtracted from the first head PES 616.1 at summing junction 638.1 to produce the first head decoupled PES 640.1; In parallel, a reference position 610 may be subtracted from the second head position measurement 654.2 at summing junction 612.2 to form the second head PES 616.2. The second head PES 616.2 may be run through a second actuator compensator 630.2 to produce a second actuator compensation value 632.2. The second actuator compensation value 632.2 may be run through a second actuator model 636.2 to produce an estimated second actuator position, which may be in turn subtracted from the second head PES 616.2 at summing junction 638.2 to produce the second head decoupled PES 640.2; The first head decoupled PES 640.1 and the second head decoupled PES 640.2 may be added together at summing junction 642, divided by 2, and passed through the VCM compensator to get the gross VCM position adjustment 648. The gross VCM position adjustment 648 and first actuator compensation value 632.1 may be respectively applied to the motor control circuit and the first actuator to change the first head position 654.1 via a superposition of the VCM and first arm dynamics 650.1 and the first actuator dynamics 634.1. In parallel, the second actuator compensation value 632.2 may be applied to the second actuator to change the second head position 654.2 via a superposition of the VCM and second arm dynamics 650.2 and the second actuator dynamics 634.2. The actuator position control system architectures shown in FIGS. 6A and 6B are applicable to the parallel self-servo writing described in the preceding sections and the parallel continuous WRRO learning that will be described next.

Figure 7A:
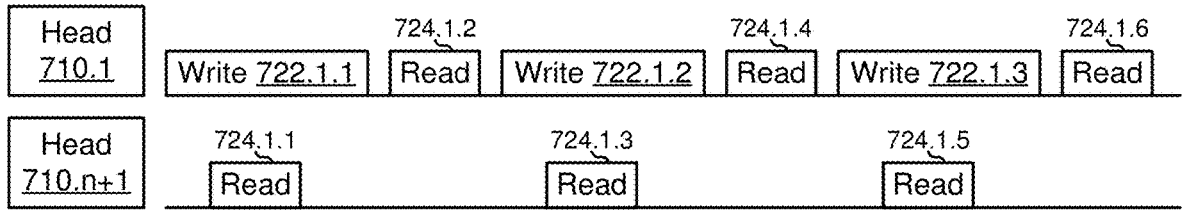
FIGS. 7A and 7B are a diagram showing an example method of wedge repeatable runout correction learning in parallel with writing media scan patterns.
Figure 7A:
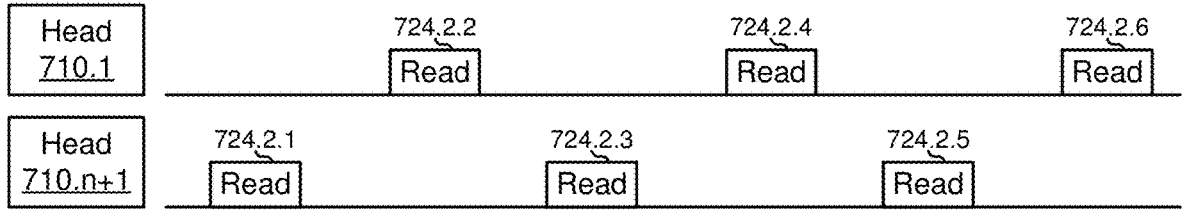
Figure 7A:
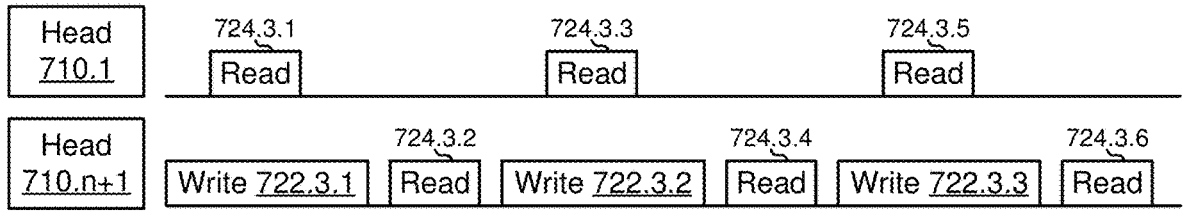
Figure 7A:
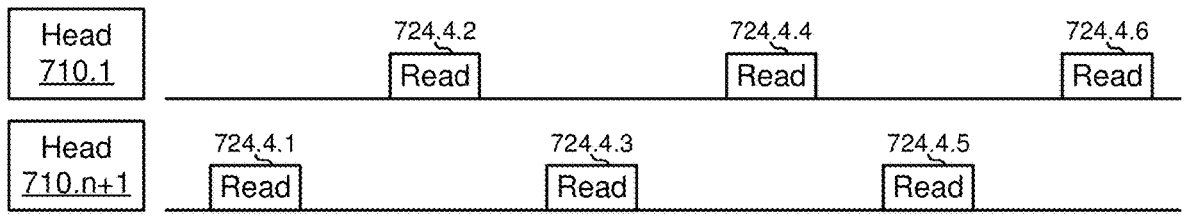
Figure 7B:
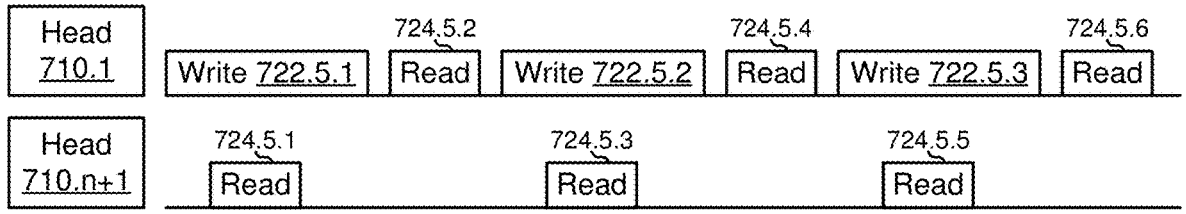
Figure 7B:
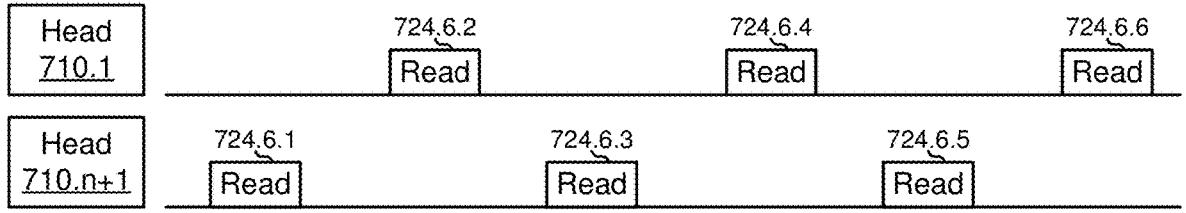
Figure 7B:
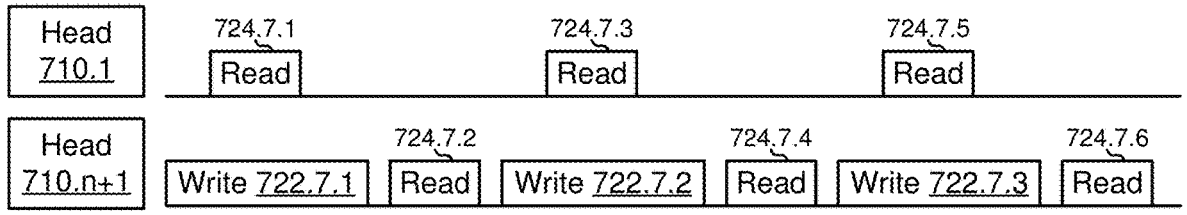
Figure 7B:
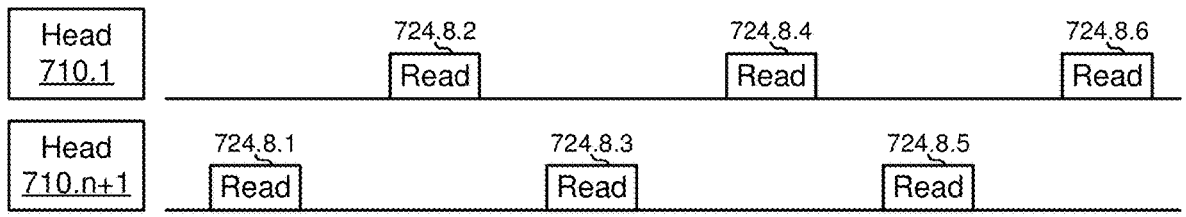

FIGS. 7A-7B show a diagram 700 for parallel continuous WRRO learning operations across a head pair 710.1 and 710.n+1. In the example shown, four revolutions 720.1-720.4 are made at four learning offsets for a first servo track i (FIG. 7A) and four revolutions 720.5-720.8 are made at the four learning offsets for the next servo track i+1 (FIG. 7B). Interleaved servo patterns across the head/media pairs may enable the servo wedges to be read alternatingly based on their relative interleaved servo offsets. So, during revolution 1 at i+1/4 720.1 read operations 724.1 may alternate between the offset servo wedges of the interleaved servo patterns. For example, head 710.n+1 may read 724.1.1, 724.1.3, and 724.1.5 the sequential servo wedges at a first learning offset (i+1/4) in the same revolution that head 710.1 may read 724.1.2, 724.1.4, and 724.1.6. In some configurations, parallel WRRO learning may be combined with writing media test patterns in the same set of revolutions per servo track. For example, during revolution 1 at i+1/4 720.1, a first tone scan pattern may be written by head 710.1 across the media surface between the servo wedges. While head 710.n+1 is reading the offset servo wedges of its media servo pattern and between the servo wedge read operations of head 710.1, tone scan pattern write operations 722.1.1, 722.1.2, and 722.1.3 may be executed through head 710.1.

Each sequential revolution 720.1-720.8 may shift heads 710.1 and 710.n+1 by the WRRO learning offset, such as a quarter servo track width. For example, from revolution 1 at i+1/4, the head positions may shift by a quarter servo track to revolution 2 at i+2/4. If a circular trajectory is used, a seek settle operation may occur between the revolutions. If a spiral trajectory is used, the head positions may shift in cross track direction gradually while the disk rotates, and hence the head moves in the down track direction during the progression of the sequential servo wedges to result in the head positions moving the WRRO learn offset by the time they reach the corresponding servo wedge on the next revolution. In one example for the case of 4 offset locations per track WRRO learning, the head would move at 1/4 of a track per revolution constant velocity while the disk rotates.

In the example shown in FIGS. 7A-7B, the media test pattern may only need to be written once per servo track. As a result, tone scan pattern 1 may be written during revolution 1 at i+1/4 720.1 to the medium surface corresponding to head 710.1 and written during revolution 3 at i+3/4 to the medium surface corresponding to head 710.n+1. Revolution 2 at i+2/4 720.2 and revolution 4 at i+4/4 720.2.4 may not include tone scan pattern write operations and only include alternating WRRO learning read operations. For example, revolution 2 at i+2/4 720.2 may alternate between read operations 724.2.1, 724.2.3, and 724.2.5 for head 710.n+1 and read operations 724.2.2, 724.2.4, and 724.2.6 for head 710.1.

In some configurations, the media test pattern may be a dual frequency test pattern that alternates tone scan patterns with different phases, such as a first tone scan pattern and a second tone scan pattern having different phase alignments. As shown in FIG. 7B, a similar method of WRRO training and tone scan pattern writing in revolutions 5 at i+1+1/4 720.5 to revolution 8 at i+1+4/4 720.8 may be used for writing the different tone scan patterns to alternating tracks.

Figure 7C:
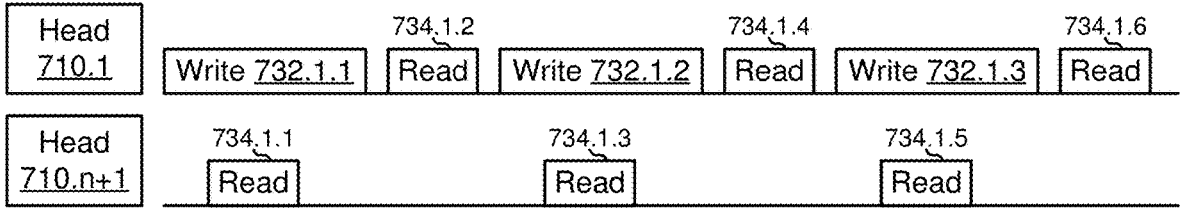
FIGS. 7C and 7D are a diagram of another example method of wedge repeatable runout correction learning in parallel with writing media scan patterns.
Figure 7C:
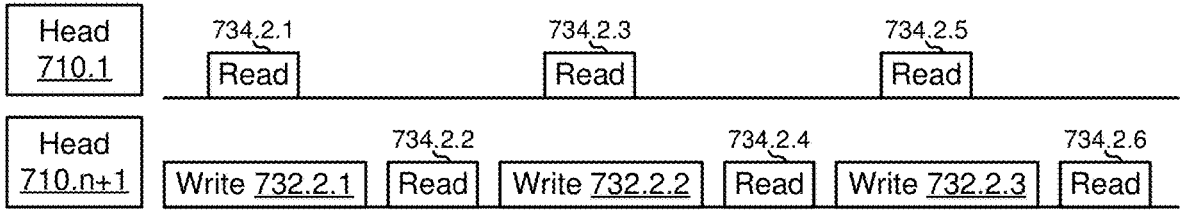
Figure 7C:
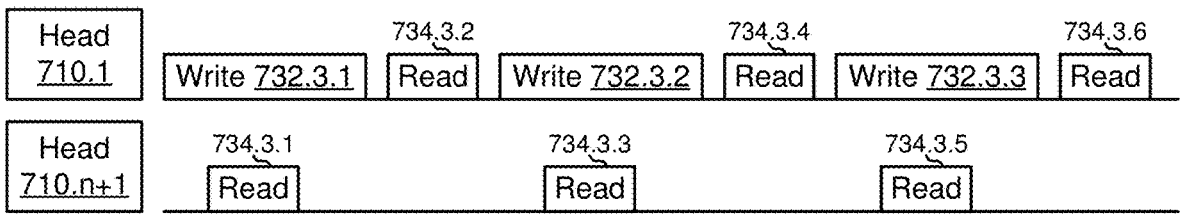
Figure 7C:
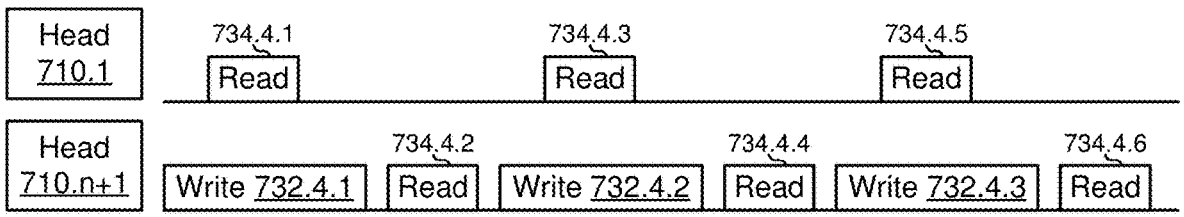
Figure 7D:
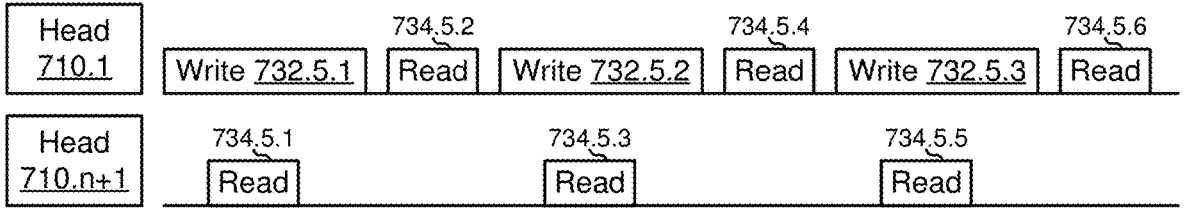
Figure 7D:
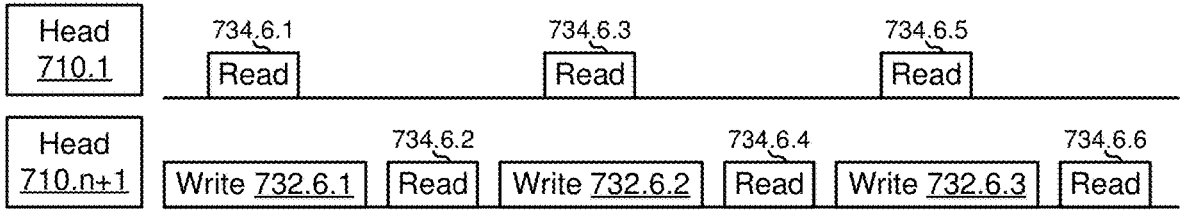
Figure 7D:
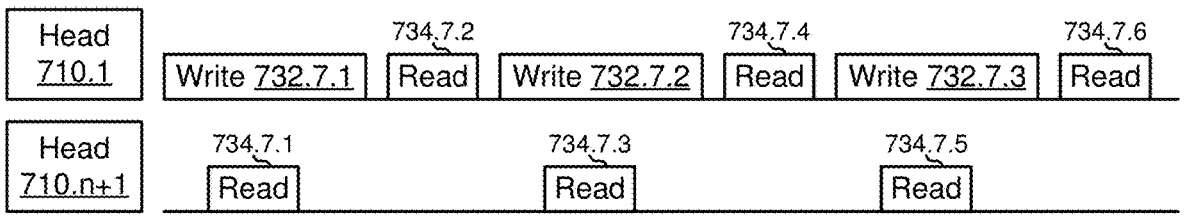
Figure 7D:
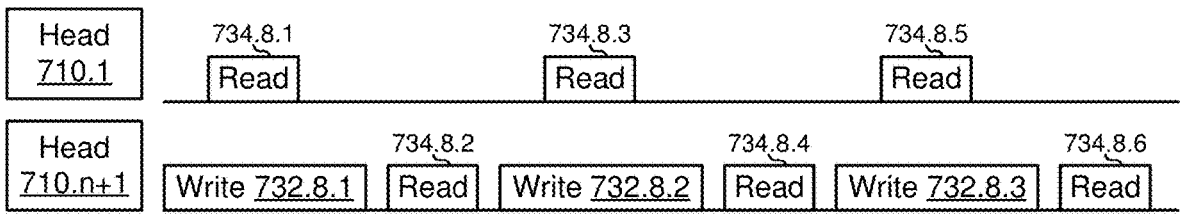

FIGS. 7C-7D show a diagram 702 for parallel continuous WRRO learning operations across head pair 710.1 and 710.n+1 where the media test pattern is written at half servo track intervals during the WRRO learning operations. Writing each tone scan pattern in two phase-aligned passes may allow a fully written pattern regardless of writer width. In the example shown, four revolutions 730.1-730.4 are made at four learning offsets for a first servo track i (FIG. 7C) and four revolutions 730.5-730.8 are made at the four learning offsets for the next servo track i+1 (FIG. 7D). During revolution 1 at i+1/4 720.1 read operations 734.1 may alternate between the offset servo wedges of the interleaved servo patterns. For example, head 710.n+1 may read 734.1.1, 734.1.3, and 734.1.5 the sequential servo wedges at the first learning offset (i+1/4) in the same revolution that head 710.1 may read 734.1.2, 734.1.4, and 734.1.6. During revolution 1 at i+1/4 730.1, a first tone scan pattern may be written by head 710.1 across the media surface between the servo wedges. While head 710.n+1 is reading the offset servo wedges of its media servo pattern and between the servo wedge read operations of head 710.1, tone scan pattern write operations 732.1.1, 732.1.2, and 732.1.3 may be executed through head 710.1 for tone scan pattern 1. During revolution 2 at i+2/4 730.2, the first tone scan pattern may be written by head 710.n+1 across the media surface between the servo wedges. While head 710.n is reading the offset servo wedges of its media servo pattern and between the servo wedge read operations of head 710.n+1, tone scan pattern write operations 732.2.1, 732.2.2, and 732.2.3 may be executed through head 710.*n*+1 for tone scan pattern 1. This pattern may be repeated for revolution 3 at i+3/4 730.3 and revolution 4 at i+4/4 730.4 with tone scan pattern 1 and controlling for phase alignment with the prior half track. Head movement per revolution may be managed substantially as described for FIGS. 7A and 7B. In some configurations, the media test pattern may be a dual frequency test pattern that alternates tone scan patterns with different frequencies, such as a first tone scan pattern and a second tone scan pattern having different frequencies. As shown in FIG. 7D, a similar method of WRRO training and tone scan pattern writing in revolutions 5 at i+1+1/4 730.5 to revolution 8 at i+1+4/4 730.8 may be used for writing the different tone scan patterns to alternating tracks.

Figure 8:
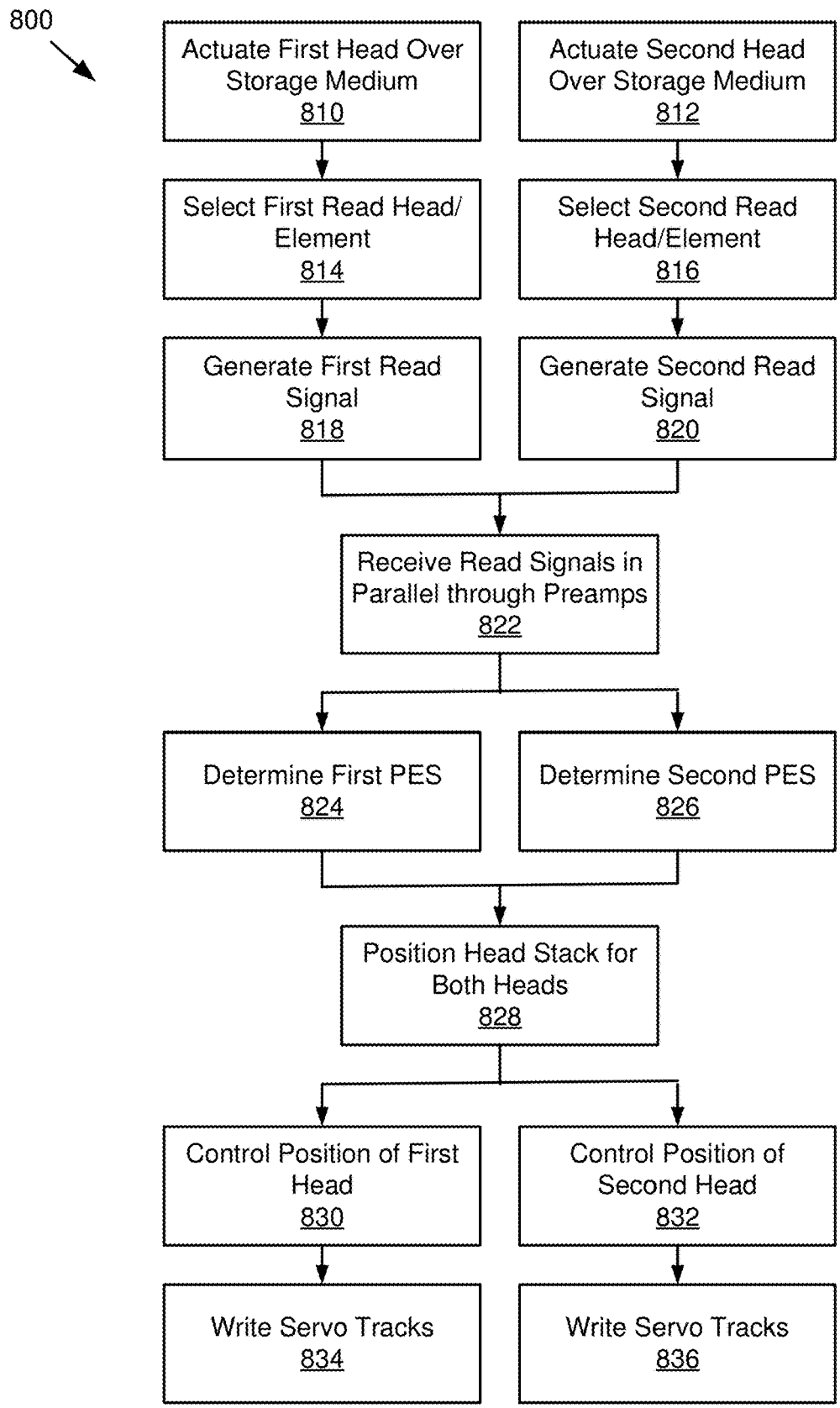
FIG. 8 is an example method of parallel self-servo writing using drive control circuitry.

As shown in FIG. 8, control circuitry 300 may be operated according to an example method of parallel self-servo writing using the various components described with regard to FIGS. 2A-6B, i.e., according to the method 800 illustrated by blocks 810-836.

At blocks 810 and 812, first and second heads are actuated over respective surfaces of a storage medium. For example, a controller may be responsible for controlling the motion of two heads selected from different head banks in a data storage device, where the first and second heads are suspended on arms over a storage medium surface and positioned by a combination of at least one VCM and at least one actuator on the arm supporting each head.

At blocks 814 and 816, different heads and corresponding read elements are selected for the parallel operation. For example, a controller may send control signals to two different preamplifier circuits to identify first and second target heads and the read sensors on those heads to be used, which may include selecting one of two read elements from each TDMR head.

At block 818 and 820, read signals may be generated from the selected read heads and elements. For example, the preamplifiers may initiate read voltages to the target heads and read elements and receive the sensor read signals generated by the first and second target heads and read elements.

At block 822, the read signals may be received in parallel through the respective preamplifier circuits. For example, the channel associated with the controller may include two read channel inputs connected to the preamplifier circuits and receive a read signal from each preamplifier in parallel.

At blocks 824 and 826, PES values may be determined for each head based on the received read signals. For example, the decoupled operation of the channel may determine separate first and second PES values for the first and second heads.

At block 828, the head stack may be positioned for both heads. For example, the controller may determine a VCM adjustment based on the two PES values to move the head stack that includes both head banks and the first and second target heads.

At blocks 830 and 832, the positions of the two heads relative to the position of the head stack may be controlled. For example, the servo controller may provide head-specific actuator adjustment values to actuators on the corresponding arms of the first and second heads.

At blocks 834 and 836, servo tracks may be written to both storage medium surfaces in parallel. For example, the controller may send servo pattern write signals to both the first target head and the second target head through their respective preamplifiers responsive to the head positions relative to SSW reference spirals being within corresponding error tolerance values.

Figure 9:
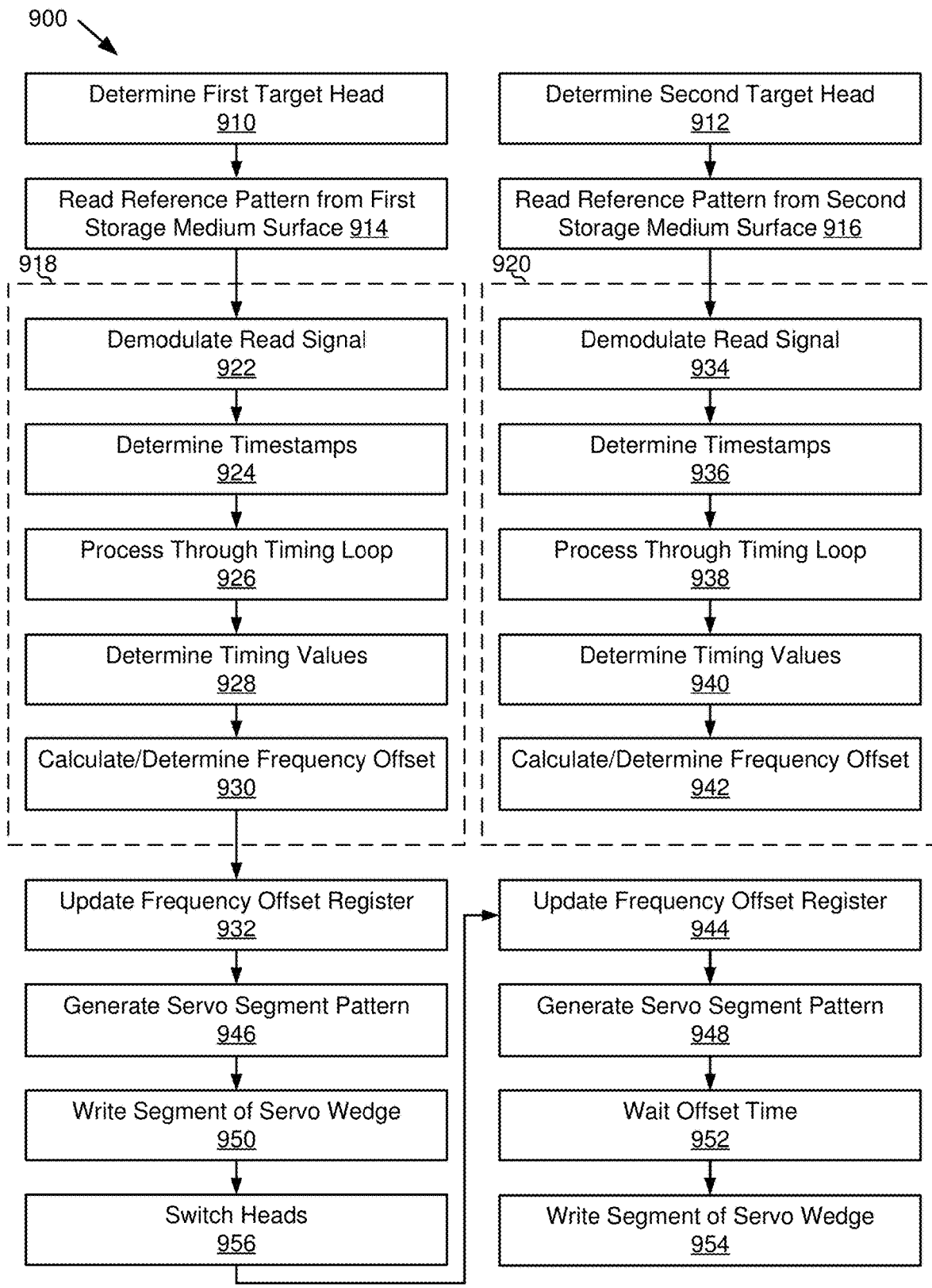
FIG. 9 is an example method of parallel self-servo writing of interleaved servo patterns with independent phase control.

As shown in FIG. 9, control circuitry 300 may be operated according to an example method of parallel self-servo writing of interleaved servo patterns with independent phase control, i.e., according to the method 900 illustrated by blocks 910-956.

At blocks 910 and 912, a pair of target heads may be determined for parallel self-servo write operations. For example, the controller may select first and second target heads from each head bank for SSW.

At blocks 914 and 916, reference patterns may be read from the corresponding storage medium surfaces of the target heads. For example, the controller may use a read element on each head and corresponding preamplifier and read channels to read a previously written servo reference pattern from the first and second storage medium surfaces corresponding to the target heads.

At 918 and 920, method 900 may include a series of blocks 922-930 and 934-942 for independently determining the servo pattern phases for the interleaved servo patterns to be written to the corresponding storage medium surfaces. For example, blocks 922-932 may be executed by the TDMR read channel path selected for the first target head to determine the phase for the next servo segment to be written to the first disk surface and blocks 934-944 may be executed by the TDMR read channel path selected for the second target head to determine the phase for the next servo segment to be written to the second disk surface.

At blocks 922 and 934, the respective read signals may be demodulated. For example, the corresponding read channels may receive and demodulate read signals from the first and second target heads.

At blocks 924 and 936, timestamps may be determined from the demodulated read signals. For example, the corresponding read channels may determine the SAM2SAM timestamps from the demodulated read signals.

At blocks 926 and 938, the timestamps may be processed through timing loops. For example, the corresponding read channels may use firmware timing loops to compare the time between timestamps to the desired timing for each of the read signals and corresponding servo wedges to be written.

At blocks 928 and 940, timing values may be determined. For example, the corresponding read channels may output timing values corresponding to the target timing and the delta or error value determined from the read signal.

At blocks 930 and 942, frequency offsets may be calculated or determined. For example, the controller may determine, based on the corresponding read signals and their timing error values, different frequency offsets may be calculated to be used to correct the phase for writing the next servo segments in each servo pattern.

At blocks 932 and 944, frequency offset registers may be updated for the respective write channels. For example, the controller may update the frequency offset register used to control the timing of the write channel when writing the next servo segment in the respective servo patterns. The frequency offset register for the first target head may first be updated at block 932 to write the corresponding servo segment and, after the head switch at block 956, the frequency offset register for the second target head may be updated at block 944.

At blocks 946 and 948, servo segment patterns may be generated. For example, the respective write channel may use the same servo pattern generator to generate the burst pattern to be written to their respective servo patterns.

At block 950 and 954, a servo segment of the next servo wedge in each servo pattern may be written. For example, the first target head may write the next servo segment to the first storage medium surface at block 950. At block 956, a head switch may be performed to switch the write head to the second surface. This may be followed by updating the frequency offset register at block 944 and generating servo segment pattern at block 948. Additionally, to interleave the two servo patterns, the writing of the servo segment by the second target head at block 954 may be delayed by waiting for an offset time at block 952. The servo pattern interleave offset time, such as half of the wedge-to-wedge timing of the servo patterns, may shift the down track location of each servo wedge on the second storage medium surface relative to the corresponding servo wedge on the first storage medium surface. After waiting the offset time at block 952, the segment of the servo wedge may be performed on the second surface at block 954. Thus, each servo wedge, while written in parallel during the same revolutions of the disk stack, may have independently controlled phase and offset positions in the corresponding physical positions on the two storage mediums. As described elsewhere, servo TPI may also be different between corresponding physical locations written during the same revolutions on the two disk surfaces.

Figure 10:
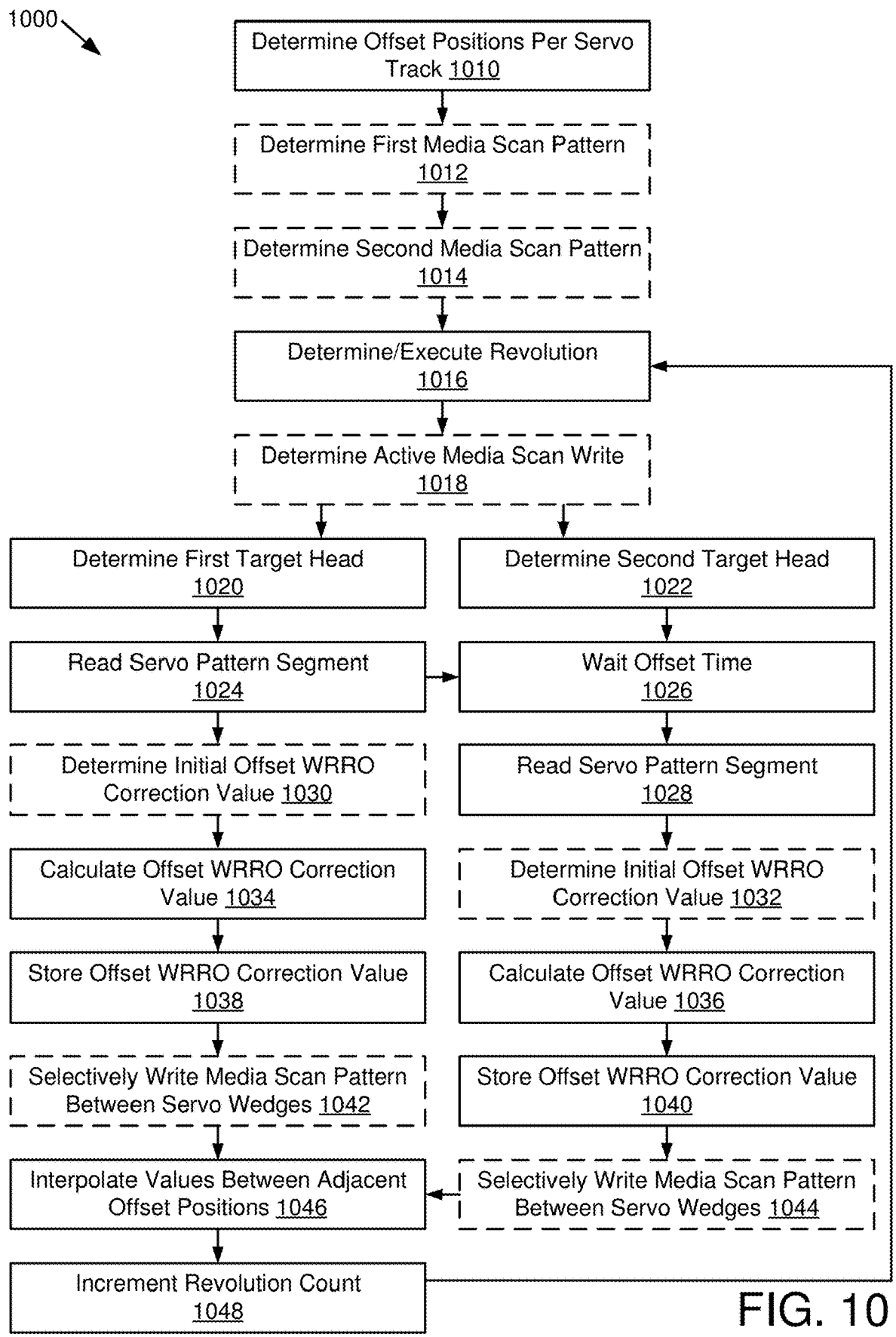
FIG. 10 is an example method of wedge repeatable runout correction training with optional parallel writing of media scan patterns.

As shown in FIG. 10, control circuitry 300 may be operated according to an example method of wedge repeatable runout correction training with optional parallel writing of media scan patterns, i.e., according to the method 1000 illustrated by blocks 1010-1048.

At block 1010, offset positions may be determined per servo track. For example, the controller may be configured with a desired number of offset positions per servo track for multiple rotations and learning read operations for each servo track.

At block 1012, a first media scan pattern may be determined. For example, in some configurations, the controller may be configured for at least one tone scan pattern used for media scans.

At block 1014, a second media scan pattern may be determined. For example, in some configurations, the controller may be configured for dual frequency media scans and use two tone scan patterns with different frequencies for media scans.

At block 1016, a revolution in the WRRO learning may be determined and executed. For example, the controller may initiate a series of revolutions of the disk stack and use two target heads for parallel learning of WRRO correction values for each head/media pair and optionally write media scan patterns determined at blocks 1012 and 1014.

At block 1018, an active media scan write operation may be determined. For example, in some configurations, the controller may determine, based on the desired media scan tone scan patterns, whether the next revolution includes a tone pattern write, and, if so, to which head/media and which tone pattern should be written. See FIGS. 7A-7D for different example configurations of WRRO learning revolutions and whether/what tone scan write operations may be active for that pass.

At blocks 1020 and 1022, a pair of target heads may be determined for parallel WRRO learning operations. For example, the controller may select first and second target heads from each head bank for WRRO learning.

At blocks 1024 and 1028, the servo pattern segment may be read from each head at the current learning down track offset position. For example, the first target head and the second target head may each generate read signals as they pass over the respective servo wedges on their storage medium surfaces and update head control position signals for their respective heads. Due to the servo pattern offset between the interleaved servo patterns on their respective storage medium surfaces, the servo wedges of the second target head may be offset from the servo wedges of the first target head and, at block 1026, the controller may switch to the second reader head and wait an offset time for the interleaved servo patterns before reading the servo pattern with the second target head at block 1028. By time multiplexing between the first and second read heads during read and using the preamplifier logic, the read-back TDMR signals from both surfaces may be sent to the same read channel for PES demodulation without needing a second read channel for the second head, thereby reducing the cost.

At blocks 1030 and 1032, initial WRRO correction values may be determined for the learning track offset of the current revolution. For example, in some configurations, the controller may use the WRRO correction value determined for the servo wedge at a prior revolution and learning track offset to determine an initial value from which to calculate the correction value for the current revolution and track offset.

At blocks 1034 and 1036, WRRO correction values may be determined for the learning track offset of the current revolution. For example, the controller may determine the WRRO correction value for the current revolution and track offset based on the PES RRO and, in some configurations, the initial WRRO correction value determined at blocks 1030 and 1032.

At blocks 1038 and 1040, WRRO correction values for the learning track offset may be stored. For example, as each WRRO correction value is determined, the controller may write the value to a data structure in non-volatile memory that maps the value to the storage medium surface, servo track, wedge, and track offset.

At blocks 1042 and 1044, media scan patterns may be selectively written between servo wedges using one of the heads. For example, in some configurations, if the controller determines one of the target heads to be an active head for writing media scan tone patterns during the current revolution (at block 1018) of the WRRO learning, then the tone pattern may be written in the portion of the media along the read/write path for the current servo track offset between the servo wedges by the target head. Within one complete revolution, only one write head is selected to perform the media scan pattern write.

At block 1046, WRRO correction values may be interpolated between correction values for sequential revolutions at the same servo wedge. For example, the controller may calculate one or more interpolated WRRO correction values for each target head, servo wedge, and sequential pair of revolutions. In some configurations, interpolation between correction values may not be calculated during the WRRO learning process and such calculations may be done after the learning operations, such as during further configuration or at run-time during servo operations.

At block 1048, the revolution count may be incremented. For example, when a revolution and associated WRRO learning reads and, optionally, tone scan writes are complete, the controller may determine the initialization of the next revolution and return to block 1016. In some configuration, a seek/settle operation may reposition the target heads to the next offtrack position or a spiral trajectory may have effectively repositioned the heads over the course of the prior revolution to be at the next offset position by the time it completes the prior revolution.

Figure 11:
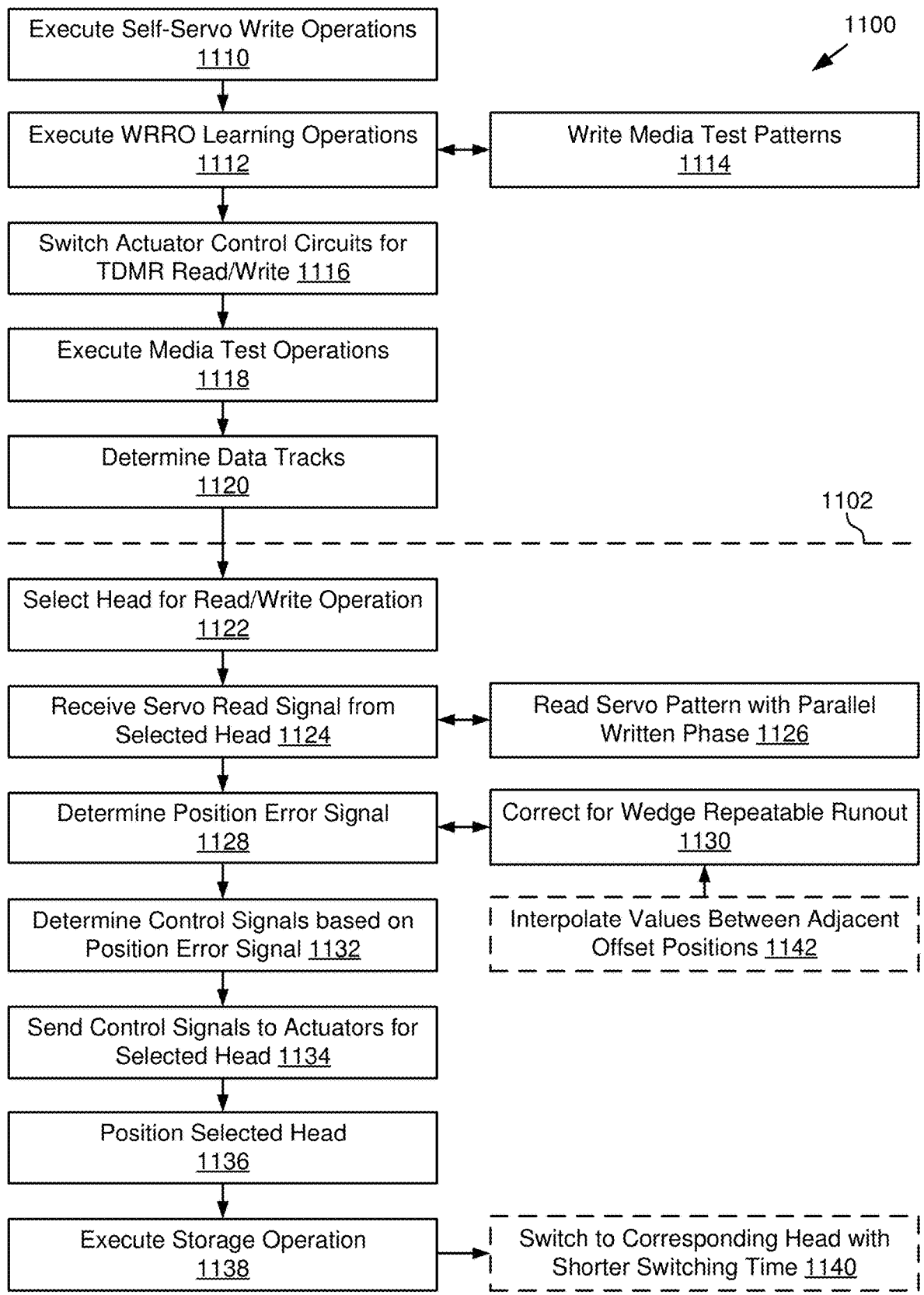
FIG. 11 is an example method of switching between self-servo writing and drive configuration operations and production read/write operations.

As shown in FIG. 11, control circuitry 300 may be operated according to an example method of switching between self-servo writing and drive configuration operations (such as WRRO learning and media scan pattern writing) and production read/write operations, i.e., according to the method 1100 illustrated by blocks 1110-1142. In some configurations, blocks 1110-1120 may be executed during drive manufacturing, testing, and configuration and, at 1102, the data storage device may be put into production use and execute blocks 1122-1142 throughout the operating life of the data storage device.

At block 1110, self-servo write operations may be executed. For example, the controller may write interleaved servo patterns using drive circuitry to parallel write all of the disk surfaces in the disk stack using corresponding pairs of TDMR heads.

At block 1112, WRRO learning operations may be executed. For example, the controller may execute multiple rotations per servo track to generate WRRO correction values for the servo tracks written at block 1110.

At block 1114, media test patterns may be written. For example, the controller may write tone scan patterns between the servo wedges. In some configurations, the tone scan patterns may be written during the same media stack rotations used for WRRO learning operations at block 1112.

At block 1116, actuator control circuits may be switched for TDMR read/write operations. For example, the controller may change from parallel operation of target head pairs that supports more efficient SSW, WRRO learning, and media test pattern writing operations to normal TDMR read/write operations that use the read and write sensors from a single head and corresponding channel paths for servo control and read/write operations.

At block 1118, media test operations may be executed. For example, the controller may execute media scan read operations using the TDMR capabilities of the heads and control circuitry to characterize the media.

At block 1120, data tracks may be determined. For example, the controller may be configured with specific data track formats relative to the servo patterns and media capabilities across various zones of the different media surfaces.

At block 1122, a head may be selected for read/write operation. For example, a data storage command may be received from a host system and the controller may determine a target media location and corresponding head for corresponding read/write operations.

At block 1124, servo read signals may be received from the selected head. For example, the controller may receive read signals from the TDMR heads from the servo wedges passing under the head. At block 1126, the servo pattern being read may have been written with independently controlled phase during parallel SSW operations at block 1110.

At block 1128, position error signals may be determined from the read signals. For example, the controller may process the TDMR read signals through the read channels to generate PES fed to a servo controller for controlling head position over the storage medium surface. At block 1130, the PES values may be corrected for known WRRO errors using WRRO correction values generated and stored at block 1112. At block 1142, WRRO correction values may be interpolated between stored correction values. For example, the controller may calculate one or more interpolated WRRO correction values for the current target head, servo wedge, and PES based on the adjacent offset values determined during WRRO learning.

At block 1132, control signals may be determined based on the position error signal. For example, the servo controller and servo interface circuit may determine control signals for the voice coil motor, micro actuator, and milli actuator for the target head.

At block 1134, the control signals may be sent to the actuators for the selected head. For example, the control signals determined at block 1132 may be sent to the corresponding actuators for the target head.

At block 1136, the selected head may be positioned. For example, the control signals sent at block 1134 may adjust the various actuators to position the selected head for the read/write operations.

At block 1138, the storage operations may be executed. For example, the controller may use the read/write elements of the selected head to read and/or write data to the data tracks defined between the servo wedges at block 1120. In some configurations, at block 1140, sequential read/write operations may have shorter switching times using storage locations on corresponding physical servo track locations on paired storage media surfaces that were written in parallel with interleaved servo patterns.

Technology for parallel self-servo writing based on data storage device hardware and software switchable between parallel self-servo write mode and data read/write operating mode, as well as specific configurations for interleaved servo patterns with independent phase control and improved WRRO learning, is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device, comprising:
   a first storage medium surface comprising a first servo pattern;
   a second storage medium surface comprising a second servo pattern; and
   control circuitry configured to:
      apply a first set of wedge repeatable runout correction values to positioning a first head over the first storage medium surface using the first servo pattern; and
      apply a second set of wedge repeatable runout correction values to positioning a second head over the second storage medium surface using the second servo pattern, wherein the first set of wedge repeatable runout correction values and the second set of wedge repeatable runout correction values were determined in parallel during a wedge repeatable runout learning operation for corresponding portions of the first servo pattern and the second servo pattern.

2. The data storage device of claim 1, wherein:
   the first servo pattern comprises a first plurality of servo wedges;
   the second servo pattern comprises a second plurality of servo wedges; and
   the first plurality of servo wedges are offset from the second plurality of servo wedges in the corresponding portions of the first servo pattern and the second servo pattern.

3. The data storage device of claim 1, wherein the control circuitry is further configured to, during wedge repeatable runout learning operations:
   read, using the first head, servo pattern segments for sequential servo wedges of the first servo pattern;
   read, using the second head and alternating with reading the servo pattern segments for the sequential servo wedges of the first servo pattern, servo pattern segments for sequential servo wedges of the second servo pattern;

calculate the first set of wedge repeatable runout correction values for the sequential servo wedges of the first servo pattern;
calculate the second set of wedge repeatable runout correction values for the sequential servo wedges of the second servo pattern;
store the first set of wedge repeatable runout correction values in a non-volatile memory of the data storage device; and
store the second set of wedge repeatable runout correction values in the non-volatile memory of the data storage device.

4. The data storage device of claim 3, wherein the control circuitry is further configured to execute the wedge repeatable runout learning operations prior to determining data tracks based on the first servo pattern and the second servo pattern.

5. The data storage device of claim 3, wherein the control circuitry is further configured to, during the wedge repeatable runout learning operations:
determine a plurality of offset positions per servo track;
execute a series of revolutions of the first storage medium surface and the second storage medium surface equal to a number of the plurality of offset positions per servo track;
read, during each revolution and corresponding to each offset position of the plurality of offset positions, the sequential servo wedges of the first servo pattern and the second servo pattern;
calculate, for each offset position of the plurality of offset positions, wedge repeatable runout correction values for the first set of wedge repeatable runout values; and
calculate, for each offset position of the plurality of offset positions, wedge repeatable runout correction values for the second set of wedge repeatable runout values.

6. The data storage device of claim 5, wherein the control circuitry is further configured to interpolate additional wedge repeatable runout values between the calculated wedge repeatable runout correction values for the plurality of offset positions for the first set of wedge repeatable runout values and the second set of wedge repeatable runout values.

7. The data storage device of claim 5, wherein the control circuitry is further configured to, during the wedge repeatable runout learning operations, set an initial value for calculating a wedge repeatable runout correction value based on a wedge repeatable runout correction value for that servo wedge from a prior revolution of the series of revolutions.

8. The data storage device of claim 5, wherein the control circuitry is further configured to, during the wedge repeatable runout learning operations, position the first head and the second head to follow a spiral trajectory when executing the series of revolutions.

9. The data storage device of claim 3, wherein the control circuitry is further configured to, during the wedge repeatable runout learning operations:
write at least one media test pattern to portions of the first storage medium surface between the sequential servo wedges in the first servo pattern; and
write the at least one media test pattern to portions of the second storage medium surface between the sequential servo wedges in the second servo pattern.

10. The data storage device of claim 9, wherein the control circuitry is further configured to, during the wedge repeatable runout learning operations:
execute a series of revolutions of the first storage medium surface and the second storage medium surface per servo track equal to a number of offset positions per servo track, wherein a servo track width divided by the number of offset positions is less than a writer width of the first head and a writer width of the second head;
write a first media test pattern to the first storage medium surface and the second storage medium surface during a first series of revolutions per servo track, wherein the written first media test pattern for each revolution in the series of revolutions for the first media test pattern are phase aligned; and
write a second media test pattern to the first storage medium surface and the second storage medium surface during a second series of revolutions per servo track, wherein the written second media test pattern for each revolution in the series of revolutions for the first media test pattern are phase aligned.

11. A method comprising:
positioning, in a data storage device, a first head over a first storage medium surface using a first servo pattern and applying a first set of wedge repeatable runout correction values; and
executing, at a first target position based on the first servo pattern, a first storage operation using the first head and the first storage medium surface;
positioning, in the data storage device, a second head over a second storage medium surface using a second servo pattern and applying a second set of wedge repeatable runout correction values, wherein the first set of wedge repeatable runout correction values and the second set of wedge repeatable runout correction values were determined in parallel during a wedge repeatable runout learning operation for corresponding portions of the first servo pattern and the second servo pattern; and
executing, at a second target position based on the second servo pattern, a second storage operation using the second head and the second storage medium surface.

12. The method of claim 11, wherein:
the first servo pattern comprises a first plurality of servo wedges;
the second servo pattern comprises a second plurality of servo wedges; and
the first plurality of servo wedges are offset from the second plurality of servo wedges in the corresponding portions of the first servo pattern and the second servo pattern.

13. The method of claim 11, further comprising, during wedge repeatable runout learning operations:
reading, using the first head, servo pattern segments for sequential servo wedges of the first servo pattern;
reading, using the second head and alternating with reading the servo pattern segments for the sequential servo wedges of the first servo pattern, servo pattern segments for sequential servo wedges of the second servo pattern;
calculating the first set of wedge repeatable runout correction values for the sequential servo wedges of the first servo pattern;
calculating the second set of wedge repeatable runout correction values for the sequential servo wedges of the second servo pattern;
storing the first set of wedge repeatable runout correction values in a non-volatile memory of the data storage device; and
storing the second set of wedge repeatable runout correction values in the non-volatile memory of the data storage device.

14. The method of claim 13, further comprising:
executing the wedge repeatable runout learning operations prior to determining data tracks based on the first servo pattern and the second servo pattern.

15. The method of claim 13, further comprising, during the wedge repeatable runout learning operations:
determining a plurality of offset positions per servo track;
executing a series of revolutions of the first storage medium surface and the second storage medium surface equal to a number of the plurality of offset positions per servo track;
reading, during each revolution and corresponding to each offset position of the plurality of offset positions, the sequential servo wedges of the first servo pattern and the second servo pattern;
calculating, for each offset position of the plurality of offset positions, wedge repeatable runout correction values for the first set of wedge repeatable runout values; and
calculating, for each offset position of the plurality of offset positions, wedge repeatable runout correction values for the second set of wedge repeatable runout values.

16. The method of claim 15, further comprising:
interpolating additional wedge repeatable runout values between the calculated wedge repeatable runout correction values for the plurality of offset positions for the first set of wedge repeatable runout values and the second set of wedge repeatable runout values.

17. The method of claim 15, further comprising, during the wedge repeatable runout learning operations:
setting an initial value for calculating a wedge repeatable runout correction value based on a wedge repeatable runout correction value for that servo wedge from a prior revolution of the series of revolutions.

18. The method of claim 15, further comprising, during the wedge repeatable runout learning operations:
positioning the first head and the second head to follow a spiral trajectory when executing the series of revolutions.

19. The method of claim 13, further comprising, during the wedge repeatable runout learning operations:
executing a series of revolutions of the first storage medium surface and the second storage medium surface per servo track equal to a number of offset positions per servo track, wherein a servo track width divided by the number of offset positions is less than a writer width of the first head and a writer width of the second head;
writing, during a first series of revolutions per servo track and to portions of the first storage medium surface between the servo wedges of the first servo pattern, a first media test pattern, wherein the written first media test pattern for each revolution in the series of revolutions for the first media test pattern are phase aligned;
writing, during the first series of revolutions per servo track and to portions of the second storage medium surface between the servo wedges of the second servo pattern, the first media test pattern;
writing, during a second series of revolutions per servo track and to portions of the first storage medium surface between the servo wedges of the first servo pattern, a second media test pattern, wherein the written second media test pattern for each revolution in the series of revolutions for the second media test pattern are phase aligned; and
writing, during the second series of revolutions per servo track and to portions of the second storage medium surface between the servo wedges of the second servo pattern, the second media test pattern.

20. A data storage device comprising:
a first head actuated over a first storage medium surface;
a second head actuated over a second storage medium surface;
means for reading, using the first head during a wedge repeatable runout learning operation, servo pattern segments for sequential servo wedges of a first servo pattern on the first storage medium surface;
means for reading, using the second head and alternating with reading the servo pattern segments for the sequential servo wedges of the first servo pattern during the wedge repeatable runout learning operation, servo pattern segments for sequential servo wedges of a second servo pattern on the second storage medium surface;
means for calculating, during the wedge repeatable runout learning operation, a first set of wedge repeatable runout correction values for the sequential servo wedges of the first servo pattern;
means for calculating, during the wedge repeatable runout learning operation, a second set of wedge repeatable runout correction values for the sequential servo wedges of the second servo pattern;
means for storing the first set of wedge repeatable runout correction values in a non-volatile memory of the data storage device; and
means for storing the second set of wedge repeatable runout correction values in the non-volatile memory of the data storage device, wherein the first set of wedge repeatable runout correction values and the second set of wedge repeatable runout correction values are determined in parallel during the wedge repeatable runout learning operation for corresponding portions of the first servo pattern and the second servo pattern.

* * * * *